United States Patent [19]

Walker

[11] Patent Number: 4,748,010

[45] Date of Patent: May 31, 1988

[54] ENERGY CONSERVING LIMESTONE CALCINING SYSTEM

[75] Inventor: Daniel D. Walker, Henderson, Nev.

[73] Assignee: Chemstar, Inc., Fort Worth, Tex.

[21] Appl. No.: 710,157

[22] Filed: Mar. 11, 1985

[51] Int. Cl.$^4$ .............................................. C01F 11/06
[52] U.S. Cl. .................................... 423/176; 423/175;
423/177; 423/438; 423/637; 423/415 R
[58] Field of Search ............... 423/175, 176, 177, 438,
423/637, 415 R

[56] References Cited

U.S. PATENT DOCUMENTS

| | | | |
|---|---|---|---|
| 1,798,802 | 3/1931 | Niles | 423/176 |
| 2,080,981 | 5/1937 | Haas | 423/176 |
| 2,113,522 | 4/1938 | Walker | 423/176 |
| 2,212,446 | 8/1940 | McIntire | 423/176 |
| 3,527,447 | 9/1970 | Kinkade et al. | 423/176 |
| 3,716,095 | 2/1973 | Ritzmann et al. | 423/175 |
| 3,743,697 | 7/1973 | Jones, Jr. | 423/175 |
| 3,991,172 | 11/1976 | Wicke et al. | 423/177 |
| 4,076,796 | 2/1978 | Reh et al. | 423/177 |
| 4,389,381 | 6/1983 | Dinovo | 423/175 |

*Primary Examiner*—Helen M. S. Sneed
*Assistant Examiner*—Anthony McFarlane

[57] ABSTRACT

Energy conserving limestone calcining system, including a process and apparatus in which in a first step or kiln zone limestone is heated, e.g., at 1700°–2100° F., sufficiently to achieve more than only about 50 or 60%, e.g., 75%, partial conversion thereof to calcium oxide and carbon dioxide and to form a partially calcined hot mass containing sufficient retained heat for substantially completing the conversion of the remaining unconverted limestone therein, and thereafter in a second step or separate vacuum chamber zone substantially completing the conversion of the limestone in the hot mass to calcium oxide and carbon dioxide by such retained heat while subjecting the partially calcined hot mass to a vacuum sufficiently to remove substantially completely the resultant carbon dioxide and for a duration sufficient to achieve such substantially complete conversion of the limestone and thereby provide a substantially completely calcined hot mass, the apparatus including a closable calcining vacuum chamber separate from and adjacent the discharge outlet of a lime kiln and arranged for receiving therefrom the partially calcined hot mass for completing the conversion of the limestone to calcium oxide and carbon dioxide and for applying a vacuum thereto for removing the carbon dioxide, and a heat retaining hood operatively enclosing the kiln discharge outlet and the vacuum chamber for minimizing heat loss from the hot mass in the vicinity of such discharge outlet and in the vacuum chamber.

22 Claims, 5 Drawing Sheets

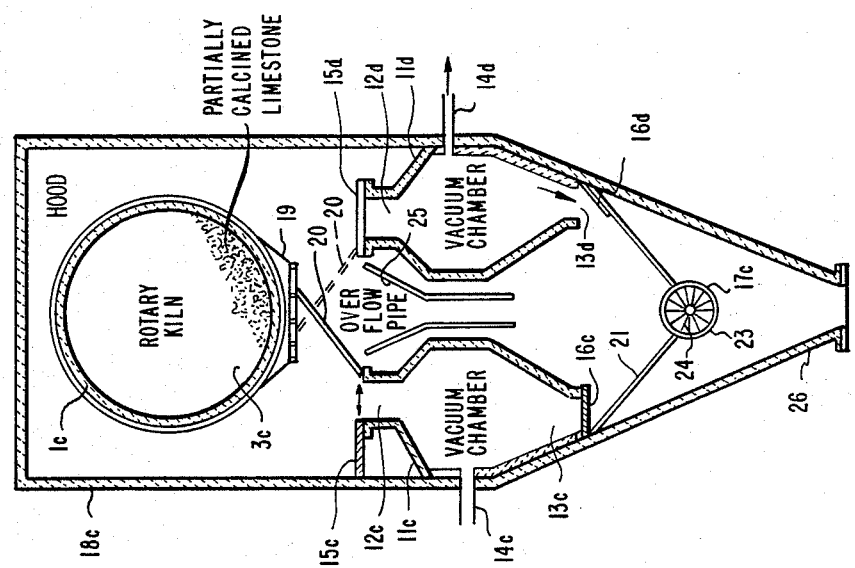
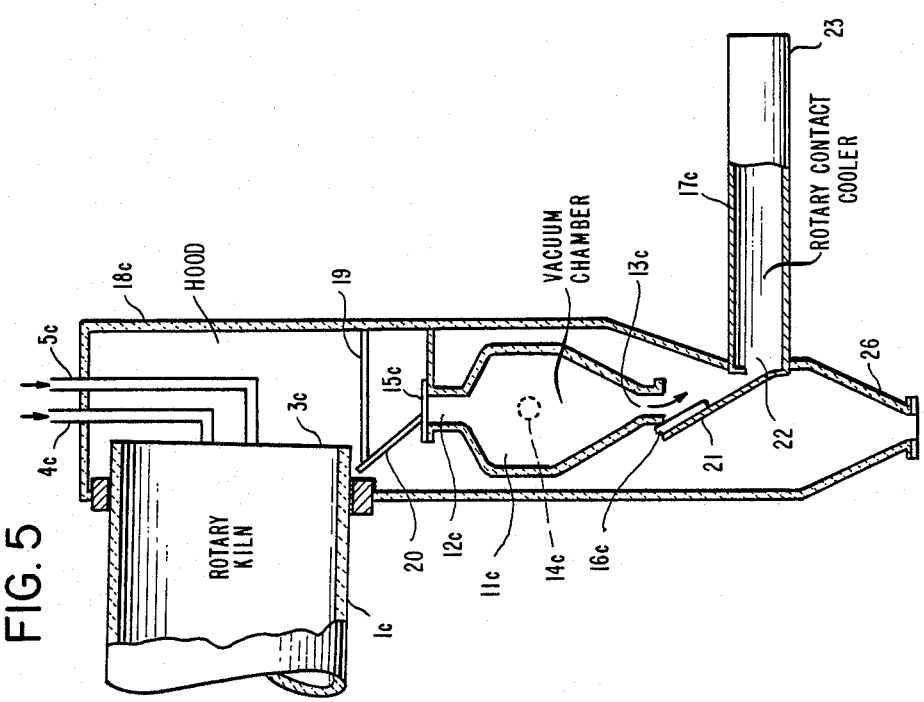

ENERGY CONSERVING LIMESTONE CALCINING SYSTEM

BACKGROUND OF THE PRESENT INVENTION

The present invention relates to an energy conserving limestone calcining system, especially as regards high calcium and/or dolomite limestone, and more particularly to a process and an apparatus for successive stage treatment of limestone to calcine the calcium carbonate, and/or magnesium carbonate, content substantially completely to calcium oxide, and/or magnesium oxide, and carbon dioxide with the use of comparatively less energy than otherwise, i.e., by incorporating certain thermodynamic principles of calcining limestone such that considerable energy is saved in the overall calcining process.

Lime (calcium oxide) manufacture involves thermally heating limestone (calcium carbonate) in a lime kiln so that carbon dioxide is liberated as a gas and solid particles of calcium oxide are left as the product, i.e. quicklime.

This can be illustrated by the following chemical equilibrium equation or reversible reaction:

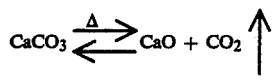

$$CaCO_3 \xrightleftharpoons{\Delta} CaO + CO_2 \uparrow \qquad (I)$$

where, according to LeChatelier's principle, the degree of dissociation is dependent on the partial pressure of $CO_2$.

Thus, if the partial pressure of $CO_2$ on the right side of the equation is reduced, the chemical ratio of $CaCO_3$ on the left side of the equation to CaO on the right side is also reduced and calcination occurs and proceeds to shift the reaction to the right side.

In a typical lime kiln, the reduction of the $CO_2$ partial pressure is accomplished by supplying excess heat energy ($\Delta$) to the mass, to shift the reaction to the right side, therefore making the calcination of limestone an energy intensive process.

The heat energy source used may be a fossil fuel such as fuel oil, producer gas, natural gas, coal, coke, etc., but due to the comparatively high cost of any such fuel, the calcination of limestone is necessarily expensive to carry out.

Parenthetically, in this regard, quicklime prices in 1984 have been stated to be about $45 to $55 per ton (Chemical and Engineering News, Vol. 62, No. 31, July 30, 1984, page 16).

In practice, limestone is calcined in lime kilns that heat the limestone rock or stone lumps as they pass through the kiln. There are two primary types of kilns:

(1) upright cylinders or stationary vertical shaft kilns in which the stone is introduced at the top and allowed to pass slowly down through a heated zone and out the bottom; and (2) rotary cylinders or horizontal rotary kilns in which the stone slowly passes through a rotating generally horizontal tubular apparatus;

in each case in countercurrent to hot heat imparting gases.

In both types of kilns, however, considerable excess heat is required to overcome the partial pressure of the attendant carbon dioxide and cause the calcination to go to completion.

This is due to the fact that limestone decomposes at comparatively moderate temperature according to the equilibrium equation I in what may be considered as a typical three component, two phase, and hence monovariant system, in which the dissociation pressure or vapor pressure of $CO_2$ depends on the temperature.

In this regard, as is clear from the equilibrium equation I, calcium carbonate, as a first solid, decomposes or dissociates into calcium oxide, as a second solid, and carbon dioxide, as a gas. Since $CaCO_3$ and CaO are both solids, their active masses or concentrations may be regarded as constant, such that the concentration of gaseous $CO_2$ in equilibrium with solid CaO and $CaCO_3$ must be constant at a given temperature. In turn, because the concentration of a gas is proportional to its pressure, it follows that at a given temperature the pressure of gaseous $CO_2$ in contact with solid CaO and $CaCO_3$ is also constant.

This temperature dependent constant pressure due to the gas formed, may be termed the dissociaton pressure or vapor pressure or partial pressure of the solid from which the gas is formed. The dissociation pressure of calcium carbonate in terms of carbon dioxide is well known as illustrated by Table 1, per the Handbook of Chemistry and Physics, 59th edition, 1978-1979, page F-90, as source, the list indicating the dissociation pressures and their related temperatures over a wide range, with the equivalent figures within parentheses having been calculated from the remaining corresponding values given in said source, in order to provide a convenient full comparison in both °C. and °F. temperatures, and in both mmHg and atmospheres absolute pressures:

TABLE 1

Dissociation Pressure Of Calcium Carbonate (Vapor Pressure Or Partial Pressure of $CO_2$ Over $CaCO_3$)

| Temperature | | Pressure | |
|---|---|---|---|
| °C. | °F. | mmHg | atm. abs. |
| 550 | (1022) | 0.41 | (0.0005394) |
| 587 | (1088.6) | 1.0 | (0.0013157) |
| 605 | (1121) | 2.3 | (0.0030263) |
| 671 | (1239.8) | 13.5 | (0.017763) |
| 680 | (1256) | 15.8 | (0.020789) |
| 691 | (1275.8) | 19.0 | (0.025) |
| 701 | (1293.8) | 23.0 | (0.030263) |
| 703 | (1297.4) | 25.5 | (0.033553) |
| 711 | (1311.8) | 32.7 | (0.043026) |
| 727 | (1340.6) | 44. | (0.057895) |
| 736 | (1356.8) | 54. | (0.071053) |
| 743 | (1369.4) | 60. | (0.078947) |
| 748 | (1378.4) | 70. | (0.092105) |
| 749 | (1380.2) | 72. | (0.094737) |
| 777 | (1430.6) | 105. | (0.13816) |
| 786 | (1446.8) | 134. | (0.17632) |
| 795 | (1463) | 150. | (0.19737) |
| 800 | (1472) | 183. | (0.24079) |
| 819 | (1506.2) | 235. | (0.30921) |
| 830 | (1526) | 255. | (0.33553) |
| 840 | (1544) | 311. | (0.40921) |
| 852 | (1565.6) | 381. | (0.50132) |
| 857 | (1574.6) | 420. | (0.55263) |
| 871 | (1599.8) | 537. | (0.70658) |
| 881 | (1617.8) | 603. | (0.79342) |
| 891 | (1635.8) | 684. | (0.9) |
| 894 | (1641.2) | 716. | (0.94211) |
| 898 | (1648.4) | 760. atm. | (1.0) |
| 906.5 | (1663.7) | (874.76) | 1.151 |
| 937 | (1718.6) | (1345.2) | 1.170 |
| 1082.5 | (1980.5) | (6757.92) | 8.892 |
| 1157.7 | (2115.86) | (14,202.12) | 18.687 |
| 1226.3 | (2239.34) | (26,093.08) | 34.333 |
| 1241 | (2265.8) | (29,771.44) | 39.094 |

Although it is seen from Table 1 that the carbon dioxide equilibrium pressure (100% $CO_2$ atmosphere) reaches atmospheric pressure (i.e. 760 mmHg or 1 atmosphere absolute) at 898° C. (1648° F.), nevertheless as a practical matter, due to a tendency for the carbonate mass to superheat, it does not decompose rapidly at about 898°–900° C. (1648°14 1652° F.), but instead requires a temperature of at least about 910° C. (1670° F.) before reasonably rapid rate decomposition is reached.

Moreover, the decomposing mass of carbonate stone lumps must be retained at such temperature for a time sufficient to achieve substantial completion of the dissociation at atmospheric pressure, and of course, the liberated or generated carbon dioxide must be removed from the vicinity of the lumps to favor the shift to the right side per the equilbrium equation I.

Generally, the dissociation is accelerated at a temperature of at least about 1000°–1100° C. (1832°–2012° F.), and especially of at least about 1038° C. (1900° F.), or in more practical commercial scale terms is accelerated at a temperature of at least about 1093°–1316° C. (2000°–2400° F.), and especially of at least about 1204° C. (2200° F.). Indeed, the higher the temperature, the higher the rate of expulsion of the forming carbon dioxide gas from the stone lumps.

This is because the dissociation necessarily progresses from the outer zone of each lump toward its center in a more or less uniform circumferentially inward manner. Although the degree of natural porosity aids both the access of heat to the inner zones of the lump and the outflow of liberated carbon dioxide gas therefrom, higher temperatures than the theoretical are required in practice to enable the dissociation to penetrate such inner zones effectively.

In this regard, as the size of the lump increases, so also must its practical dissociation temperature and calcining residence time, in order for the dissociation to reach the center or core portion of the lump and for the temperature to cause the generating carbon dioxide to develop a sufficiently increased internal pressure in the interior of the lump for outward escape of the gas from the confines of such inner zones through the existing pores.

To the extent that water and organic impurities are present in the lump, they are volatilized and the organic impurities in turn are burned as the lump becomes heated, thereby preliminarily increasing the porosity of the lump for more effective dissociation of the carbonate within the crystal lattice of the lump once the carbonate dissociation is thereafter initiated.

The calcium oxide product is essentially infusible at the calcining temperatures used, and while it retains the general form of the original lump of starting calcium carbonate, it crumbles easily. As a result of the calcining, the crystalline mass has a tendency to contract or shrink in volume, thereby narrowing its pores. This effect is more prounounced as the calcination temperature is increased.

In particular, if the carbonate starting material contains mineral impurities, especially silica, it should not be heated much above 1000° C. (1832° F.) because at this temperature, lime reacts with the silica and some of its other impurities, such as alumina and iron oxide, to form a fusible slag which seems to glaze over the oxide particles and adversely prevents subsequent reaction of the product with water, as in the forming of hydrated lime or calcium hydroxide.

Similar adverse effects occur from the absorption on the surface of the lumps of impurities, e.g. from ash and/or sulfur, in the fuel, i.e., in the case where the fuel or its combustion products come into direct contact with the lumps in the kiln.

The use of comparatively higher calcining temperatures, even in the case of relatively pure carbonate starting material, often adversely results in undue overburning of the surface layer of the lump, which leads to a reduction in the porosity, surface area and reactivity of the product.

Such undesired non-reactive forms are variously referred to as "hardburned" lime, "overburned" lime or "dead burned" lime, as the case may be, and these surface defective forms may contain various complex compounds on the surface of the lumps such as monocalcium and dicalcium silicates, calcium aluminates, calcium and dicalcium ferrite, calcium sulfate, and the like, which occlude the pores of the lumps and detract from the surface area and reactivity of the product, or may simply be overburned to the extent that the porosity and surface area of the lumps are so reduced that the product is sintered and essentially chemically inert.

Inasmuch as the burning or calcining of limestone is a simple thermal decomposition, in which it is generally necessary only to provide, as aforesaid, for a supply of heat and for the removal of the carbon dioxide which is formed, it would theoretically appear advntageous from the inherent temperature-vapor pressure relationship involved, simply to provide for sweeping away the carbon dioxide gas as rapidly as it is formed.

However, this advantage has not been realized in practice because in industrial scale operations, the lumps of limestone are comparatively appreciable in size, but more importantly because the crust or coating of calcium oxide as first formed on the outer zones of the lumps seems to act as a sponge to hold the vicinal carbon dioxide in contact with the reacting face of a given lump, by way of surface absorption thereat and/or superficial recarbonation, and thus to retard release of the carbon dioxide and full exchange via the pores with the inner zones of the lump for achieving more complete conversion of the latter to calcium oxide.

Consequently, the operation as a practical matter requires the full decomposition temperature demanded by the pressure equilibrium with the atmosphere to achieve substantially complete calcination as desired.

Where, on the other hand, the limestone is undesirably calcined insufficiently, e.g. at too low a temperature and/or for too short a residence time in the kiln, a comparatively large center or core of unconverted calcium carbonate is left in the lime lumps, and such core containing defective form is referred to as "underburned" lime.

Thus, other things being equal, limestone calcination is beset with the independent problems of minimizing adverse surface defects by the use of comparatively low calcining tempreatures, and at the same time of maximizing dissociation of the carbonate core by the use of comparatively high calcining temperatures, for a given residence time of the carbonate lumps in the kiln, so as to avoid the doubly undesirable result of a lump product having both an overburned surface and an underburned core.

As a general rule, higher burning temperatures and longer calcination times lead to a harder burned lime product of comparatively high shrinkage and density, and low porosity, surface area and chemical reactivity, whereas lower burning temperatures and/or shorter calcination times lead to a generally more desirable soft burned lime product of relatively low shrinkage and density, and high porosity, surface area and chemical reactivity, with a relatively small unreacted core and thus considered substantially completely calcined.

The degree of substantially complete dissociation of the calcium carbonate content to calcium oxide and carbon dioxide, and of any other carbonate also present, can be conventionally measured for example by the percentage by weight of loss on ignition (LOI), i.e. of $CO_2$.

Inasmuch as lime is a poor heat conductor, and high local overheating should be avoided, a comparatively low temperature flame of large volume is usually employed for the calcining when conducted by direct heat exchange contact with the fuel and/or its combustion gases.

In the case of a vertical shaft kiln, the fineness of the limestone lumps used is limited by the necessity of keeping the comparatively static charge open enough by way of void spaces throughout its extent to induce a free passage of the flame and the products of combustion through the mass so as to avoid uneven burning or calcining of the stone. For this reason, small size stone lumps are normally avoided in a vertical shaft kiln since they do not provide large enough void spaces for adequate circulation of the flame and gases through the calcining mass.

On the other hand, since the charge is continuously tumbled on itself as it passes dynamically through the interior of a rotary kiln, smaller size limestone lumps are readily used therein, and the calcining residence time is therefore shorter than in the case of vertical shaft kilns.

For the shaft kiln calcination, the fuel consumption on an industrial sacle can, for instance, amount to about 4 to 6 million Btu/ton (1112 to 1668 kcal/kg) of limestone, e.g. in a modern central burner type vertical shaft kiln, and for rotary kiln calcination it can, for instance, amount to about 4.7 to slightly above 7 million Btu/ton (1307 to slightly above 1946 kcal/kg) of limestone, e.g. in a current type rotary kiln.

Larger size lump stone such as 4 to 8 inch lump stone is normally calcined in vertical shaft kilns, and smaller size lump stone such as that below about 4 inch lump stone, and particularly 0.25 to 2.5 inch lump stone or pebble lump stone, is normally calcined in horizontal rotary kilns.

Different size stones, of course, burn or are calcined at different rates since as earlier noted, the dissociation progresses from the outer to the inner zones of the limestone lumps. For uniformity of results, therefore, a uniform size or narrow graduation range of stone is best. While it would seem expedient to use the minimum possible size stone in a narrow graduation range to shorten the residence time in the kiln and conserve fuel energy and also obtain a uniform product, this must be balanced against the cost of crushing the raw stone from the quarry to achieve such narrow graduation range reduced size at acceptable levels of wastage in terms of fines, dust, etc.

It will be appreciated that the operation, including the calcining temperature and the kiln residence time selected, and in turn the quality and condition of the resultant oxide product, will necessarily depend not only on the content of impurities in the starting limestone and/or in any fuel or its combustion products coming into contact therewith, e.g. silica, alumina, iron oxide, etc., and on the lump size, but also on the extent to which associated magnesium carbonate ($MgCO_3$) is present with the calcium carbonate, e.g. in dolomitic limestone or in magnesian limestone as compared to high calcium limestone. Magnesium carbonate, of course, decomposes at a lower temperature than calcium carbonate.

In this regard, as to commercially available forms of carbonate rock or stone of such types usable for lime production, in addition to an impurities content, mostly silica, of, for instance, about 1-3%, magnesian limestone or magnesite has a magnesium carbonate content (e.g. 5-20% $MgCO_3$) generally intermediate that of high calcium limestone or calcite (e.g. of 97-99% $CaCO_3$) and dolomitic limestone or dolomite (e.g. 40-43% $MgCO_3$). Nevertheless, the magnesium carbonate compontent of dolomite seems to decompose at higher temperatures (e.g. 725° C. or 1133.7° F.; 760 mmHg) than in the case of natural magnesite.

Ordinarily, any carbonate rock having at least about 20% magnesium carbonate content is often roughly considered to be "dolomite" and that having at most about 2-5% magnesium carbonate is in turn roughly considered to be high calcium limestone. Because the proportion of magnesium carbonate varies among rock species, the dissociation temperature thereof correspondingly varies.

Consequently, upon calcination, due to the earlier dissociation of the $MgCO_3$ content, the resulting MgO content is ordinarily hardburned to at least some extent prior to the ensuing dissociation of the $CaCO_3$ content to CaO, inasmuch as the mass must be retained at a relatively high temperature throughout in order to achieve substantial completion of the $CaCO_3$ dissociation for forming soft burned CaO.

This hard burned MgO content may be minimized to some extent by calcining the stone at minimum and constant temperature but for a longer residence time in the kiln.

As a rule, for less pure limestone (higher $MgCO_3$ content), a calcining temperature of at least about 910° C. (1670° F.) and up to about 1000° C. (1832° F.) is typically used, and for limestone of higher calcium carbonate content or purity (lower $MgCO_3$ content), a calcining temperature of between about 1000°-1100° C. (1832°-2012° F.) is typically used.

However, the operation may be carried out at still higher temperatures, e.g. up to about 1149° C. (2100° F.) or even up to about 1241° C. (2266° F.), as indicated in Table 1, or in more practical commercial scale terms up to about 1204° C. (2200° F.) or even up to 1316° C. (2400° F.), and in some cases up to 1482° C. (2700° F.), depending on the circumstances and the product results sought.

Aside from the foregoing, it will be further appreciated that as the calcining temperature increases, so does the tendency of the limestone impurities and those in any direct contact heating fuel used, such as ash constituents and sulfur in coal or coke, and sulfur in fuel oil, to react not only with the forming lime content itself in the lumps, but also with the refractory lining of the kiln. Where higher calcining temperatures are contemplated, e.g. above about 1100° C. (2012° F.) and especially above about 1149° C. (2100° F.), more expensive refractory linings are required for the kiln to minimize the effects of this tendency.

In fact, local overheating or hot spots not only lead to nonuniformity in the calcining product, but also often cause accretions and premature failure of the refractory lining, especially in rotary kilns using coal as fuel, requiring premature shut down for repairs. Due to the nature and thickness of such linings, start up and shut down of the kiln operation, which is normally a twenty four hour a day continuous operation, must be carried out by slow incremental heating and cooling, respectively, in order to minimize the adverse effects of thermal expansion and contraction in damaging the integrity of the refractory material itself, since any sudden change in temperature can cause the lining to disintegrate.

As is known, these refractory linings must be reasonably thick in order to provide structural protection of metal parts and at the same time minimize heat loss from the kiln. Their repair and replacement further burdens the cost of lime production, since apart from the cost of such repair and replacement the kiln must be kept out of service during the interim, and for each instance of down time the kiln must be slowly cooled and in turn slowly reheated, thereby consuming extra time and extra fuel without any benefit in terms of limestone calcining throughput.

The usual vertical shaft kiln generally consists of an upright steel cylinder for strength and prevention of gas leakage, which is lined with fire brick as refractory material. It may be fired for instance with producer gas, e.g. laterally or centrally supplied to a throat portion near the bottom of the shaft, such that a major portion of the air for combustion is upwardly supplied through the bottom. The relatively large lump limestone is continuously fed to the top of the shaft, and is preheated by the upwardly rising hot gases and then calcined at the combustion zone in the vicinity of the throat portion supplied with the producer gas and where the gas meets the incoming air, already itself preheated by the descending mass of hot lime which exits from the bottom of the shaft. The products of combustion and liberated carbon dioxide are discharged as spent gases for instance laterally at a point near the top of the shaft.

On the other hand, if coal is employed as the shaft kiln fuel, e.g. in a fire box of an indirect fired kiln, this same air supply principle may be used, such that secondary combustion may be induced in the body of the kiln by introducing some of the air through the bottom of the kiln. This prevents an excessive temperature in the region adjoining the fire box, and makes possible a kiln of much larger cross section than otherwise.

In particular, the use of producer gas, which is highly diluted with nitrogen and added steam, generally insures a voluminous flame which penetrates throughout the entire central body of the kiln. The gas flame may be made of even larger volume without dropping the temperature in the kiln, by the expedient of recycling to the intake of the producer for the producer gas some of the spent gases exiting from the top of the kiln since the carbon dioxide in this gas is partially reduced by the well known endothermic reaction to carbon monoxide in the hot body of the producer, and thus enriches the fuel gas thereafter fed to the kiln.

However, at the same time, this expedient undesirably not only consumes heat energy in the upstream producer to compensate for such endothermic reaction, even though it may not drop the temperature in the downstream kiln, but also and more importantly enriches the kiln with that part of the carbon dioxide in such recycled spent gases which is not so reduced to carbon monoxide, to the relative detriment of the carbon dioxide partial pressure and the desired shift to the right side per the equilibrium equation I.

Furthermore, aside from recycling $CO_2$ containing exhaust gases directly or indirectly to the lime kiln, and aside from the relative cost of solid fuel such as coal and coke (e.g. of calorific value of about 10,000–16,000 Btu/lb.), and liquid fuel such as fuel oil (e.g. of calorific value of about 16,000–18,000 Btu/lb.), as compared to gaseous fuel such as natural gas (e.g. of calorific value of about 900–1200 Btu/ft$^3$), producer gas (e.g. of calorific value of about 150–300 Btu/ft$^3$ from coal), etc., it will be appreciated that, other things being equal, while the combustion conditions may be adjusted for substantially complete burning, on the one hand, of solid or liquid fuel theoretically to $CO_2$ and $H_2O$ in the combustion gases, nevertheless, on the other hand in the case of gaseous fuel, even where substantially completely burned as well, the combustion gases will inherently contain a higher $CO_2$ content in all cases but natural gas, due to the significant presence of extraneous $CO_2$ in the synthesized starting gas.

This extraneous source of $CO_2$ will also independently adversely influence the $CO_2$ partial pressure in the lime kiln and lead to relatively less efficient results in the same sense as occurs in recycling spent gases to the kiln.

Moreover, in the case of all such fuels, including those synthesized gaseous fuels containing extraneous $CO_2$, although in the primary reaction the carbon content of the fuel is oxidized to $CO_2$, and any hydrogen content of the fuel is oxidized to $H_2O$, an undesired secondary reaction often occurs as well, in which part of the $CO_2$ present in the combustion gases reacts with additional carbon, e.g. where there is relatively an insufficiency of oxygen and/or an excess of hydrogen in the combustion system, and is thereby reduced to CO.

As earlier noted, the reduction of carbon dioxide to carbon monoxide involves an endothermic reaction, and this decreases the kiln temperature, directly or indirectly, as well as causes potentially usable heat values to be lost with the spent combustion gases exiting from the kiln. As a result, there is a corresponding reduction in the thermal efficiency of the calcining operation.

In contrast to the vertical shaft kiln which is normally used for burning or calcining relatively large lump stone, a horizontal rotary kiln is used normally for burning relatively small lump stone, and generally consists of a slightly inclined steel tube, which is also lined with refractory material. It may be fired for instance by gas as above discussed or by powdered coal or by atomized and vaporized fuel oil. Because the stone is of relatively smaller size, it is generally calcined in a much shorter time than in the case of the vertical shaft kiln, as earlier noted.

It will be appreciated that modern day rotary kilns can readily burn coal, gas or atomized and vaporized fuel oil with equally good calcining results, whereas most existing vertical shaft kilns are normally more restricted in terms of their design features to burning gas or fuel oil, few being able to accommodate solid fuel with any degree of efficiency except as producer gas source.

Theoretically, based on the equilibrium equation I, the complete conversion of calcium carbonate (mol. wt. 100) to calcium oxide (mol. wt. 56) and carbon dioxide (mol. wt. 44) causes a 44% reduction in weight of the starting limestone solids content (theoretically 44%

LOI), and provides a corresponding 56% reduced weight quicklime product. Although the infusible quicklime product obtained generally retains the form of the original lumps of starting limestone, as earlier noted, its bulk is 44% lighter in weight and, other things being equal, is correspondingly more porous internally or less dense due to the loss of the carbon dioxide content from the crystal lattice of the starting solids material.

In the case of the proportionate content of magnesium carbonate (mol. wt. 84.3) also present in the starting carbonate rock or stone, theoretically its complete dissociation to magnesium oxide or magnesia, e.g. periclase (mol. wt. 40.3), and carbon dioxide (mol. wt. 44) causes a 52.2% reduction in its weight content (theoretically 52.2% LOI), and provides a proportionate 47.8% reduced weight final solids content. Hence, the greater the magnesium carbonate content in the starting carbonate rock or stone, the greater will be the weight loss after calcination.

However, in all cases, the calcining will only proceed to substantially complete decomposition of the limestone when the partial pressure of the produced carbon dioxide is maintained constantly below the equilibrium pressure at the corresponding temperature, and this usually requires a calcining temperature over 898°–900° C. (1648°–1652° F.) to drive the action forward, i.e. at normal atmospheric pressure, such as a temperature of from about 1000°–1100° C. (1832°–2012° F.), as aforesaid.

In actuality, because of the various practical factors involved, complete calcination of any commercially available carbonate rock will never provide a product which is 100% free of carbon dioxide, such being essential unattainable even under strict laboratory conditions.

Instead, some superficial recarbonation about the lump exterior will normally occur, due to the carbon dioxide rich atmosphere in the kiln traceable to the carbon dioxide liberated from the lump itself and that in any attendant combustion gases in direct contact with the lumps in the kiln, so that at least about 0.1–0.2% $CO_2$ will always be present in the calcined lump. However, this recarbonated surface coating in fact limits further recarbonation since it occludes the surface pores of the lump sufficiently to inhibit recarbonation of attendant carbon dioxide gas to a further extent within the inner zones of the lump under the normal calcining temperatures involved.

Also, even in the case of soft burned lime, a small calcium carbonate core, e.g. about 0.25–2%, normally remains in the center of the lump product, as attempts to achieve dissociation completely of such core would otherwise cause the lime to be overburned or sintered to dead burned or nonreactive condition.

Hence, as contemplated herein, substantially complete calcining embraces the concept of carbonate rock dissociation to such an extent that the oxide particle product possesses at most about 0.1–0.2%, or less preferably at most up to about 2%, $CO_2$ as particle or lump surface recarbonated coating, and at most about 0.25–2%, and less preferably at most up to about 5%, unconverted carbonate as core material.

Various specific proposals are known for vacuum calcining of carbonate rock and the like, which employ direct or indirect heat exchange systems using solid, liquid or gaseous fuels or electrical energy, generally in arrangements of the vertical shaft kiln type. However, these may be deemed obsolete in terms of present day energy costs since they inefficiently consume prohibitive quantities of thermal energy in attempting to achieve such vacuum calcining operation, as is clear from the following.

McTighe (U.S. Pat. No. 736,869, issued 1903), per a first embodiment, calcines a batch of limestone, under vacuum and by indirect heat exchange, in a closed vertical furnace to make carbon monoxide. The furnace contains a vertical central tube filled with coke or coal and flow connected at its top end with a series of surrounding like tubes filled with limestone, all the tubes being inserted in a bed of solid fuel disposed in the furnace. The furnace has a combustion products flue at its upper end above the level of the bed fuel and an ash pit at its lower end separated from the bed fuel by grates and presumably freely supplied with combustion air for upward flow through the grates. A vacuum pipe is connected to the bottom end of the central coke and coal tube for applying a vacuum to all of the tubes.

Upon burning the bed fuel in the McTighe first embodiment, the limestone and coke or coal in the respective tubes are heated by indirect heat exchange to incandescence at about half the temperature normally used, such that the entire limestone charge is calcined under vacuum and the liberated carbon dioxide is drawn from the limestone tubes through the central tube for endothermic reaction therein with the coke or coal to form carbon monoxide (which thereby consumes heat and produces a cooling effect), the carbon monoxide being recovered via the vacuum pipe as a valuable product, as opposed to carbon dioxide as a waste product.

McTighe, per a second embodiment, omits the central tube, flow connects the limestone tubes via ports near their top ends directly with the fuel bed in the furnace, and inserts an air blast pipe and a first vacuum pipe in the ash pit. A crude petroleum oil supply pipe is also inserted in the ash pit and a second vacuum pipe is inserted directly into the fuel bed for use in making illuminating gas. In this two phase cycle operation, first air is supplied from the air blast pipe to the bed to burn the fuel to heat to incandescence both the limestone batch, by indirect heat exchange, and the bed fuel, by direct combustion, with the combustion products exiting from the flue as in the first embodiment, and then the air supply is terminated and the flue is shut, after which a vacuum is applied via the first vacuum pipe to draw the liberated carbon dioxide from the limestone tubes via the tube ports through the bed of incandescent fuel for endothermic reaction therewith to form carbon monoxide which is recovered from the ash pit via the first vacuum pipe. When the bed is reduced by such reaction to a temperature below the working point, the first vacuum pipe is reclosed, the flue is reopened and the air resupplied from the air blast pipe to repeat the cycle.

To obtain illuminating gas in the McTighe second embodiment, during the carbon monoxide forming phase the first vacuum pipe is closed and the second vacuum pipe is opened while crude petroleum is supplied to the ash pit, whereupon the oil is vaporized and drawn through the bed along with the carbon dioxide from the tubes to produce a mixture of carbon monoxide and hydrocarbon gas which is recovered via the second vacuum pipe.

Since only indirect heat exchange is used to calcine the limestone batch in the tubes, very low thermal efficiency and very high fuel consumption per unit limestone throughput necessarily burden the McTighe system, and such negative aspects are aggravated by the extra fuel consumption demands for supplying heat for the separate suction induced carbon monoxide forming endothermic reaction, whether the latter consumes the coke or coal in the central tube per the first embodiment or the solid fuel of the bed itself in the furnace per the second embodiment. Essentially continuous consumption of fuel for heating the entire charge must be carried out until complete calcination is achieved, and at an accelerated fuel consumption rate under the suction induced flow in the system.

Niles (U.S. Pat. No. 1,798,802, issued 1931) calcines a batch of limestone, under vacuum in the presence of injected steam and by direct heat exchange, in a closed vertical shaft kiln at lower temperatures than otherwise, to avoid underdecomposing or overheating, recarbonation and semifusion, and instead produce a more uniform product. A bed of solid fuel in a fire box, surrounding and communicating with the calcining zone of the kiln, is supplied via an air fan with primary air, preheated by indirect heat exchange in flues surrounding the bottom discharge end of the kiln, and burned in the presence of steam injected both above and below the fuel bed, for direct heat exchange calcining of the charge, such that the spent combustion gases and liberated carbon dioxide are withdrawn from the top of the charge by a suction fan for recycling one portion to mix with the fresh combustion gases above the fuel bed in the fire box and for venting the remaining portion to the atmosphere to maintain the vacuum balance. The use of steam injection above the fuel bed to induce the recycled flow of the spent combustion gases and liberated carbon dioxide can replace the suction fan, and the use of steam injection below the fuel bed to induce the primary air flow can replace or be used in conjunction with the air fan.

In Niles, the steam injected below the fuel bed undergoes an endothermic water gas reaction with the solid fuel to form carbon monoxide and hydrogen (which thereby consumes heat and produces a cooling effect) and the latter in the presence of the primary air by way of a secondary reaction form carbon dioxide and reaction steam. This steam and the injected steam are said to decrease the partial pressure of the carbon dioxide and assist the release of carbon dioxide from the charge, whereas the recycled portion of the spent combustion gases and liberated carbon dioxide is said to cool and dilute the fresh combustion gases above the fuel bed for lower temperature operation in the kiln. The vacuum is stated to be minus four inches of water at the top of the kiln and two to three inches of water above the fuel bed in the fire box.

Obviously, in Niles the recycled carbon dioxide burdens the closed system as does that formed from the steam and solid fuel water gas reaction and the primary air supported secondary reaction, and the cooling effect of such recycled gases and that resulting from the water gas carbon monoxide reaction not only represent a reduction in thermal efficiency but, together with the need to supply heat for extraneous production of injected steam, also a concordantly higher fuel consumption per unit limestone throughput. Due to the intentional recycling of liberated carbon dioxide from the charge plus that in the spent combustion gases traceable to the combustion of the solid fuel in the fire box, which enrich the normal carbon dioxide content in the fresh combustion gases entering the calcining zone from the fire box, an undesirably high total content of carbon dioxide will build up in the closed system which will offset any benefits in reducing the carbon dioxide partial pressure by the injection of steam, except to the extent that a high vacuum load is utilized and a high proportion of the withdrawn gases from the top of the charge is correspondingly vented to the atmosphere, all of which will accelerate the fuel consumption rate and steam consumption rate, and unnecessarily add to the cost per unit limestone throughput. Continuous consumption of both fuel and steam for heating the entire charge must be carried out until complete calcination is achieved.

Hyde (U.S. Pat. No. 1,810,313, issued 1931) partially calcines a continuous supply of individual batches of limestone or other roastable material of mixed size lumps, preferably mixed with coal or other fuel, under vacuum and by direct heat exchange, on a continuously moving endless conveyor in a horizontal kiln. The batches are conveyed on pervious supports through a closed heating zone where fresh combustion gases from the burning of oil, gas or powdered coal in an adjacent fire box are drawn through the material via a suction box below the pervious supports and optionally recycled to a separate upstream preheater zone before discharge as spent gases. The partially calcined material batches are then conveyed to a separate closed, static soaking zone, not provided with heat or suction removal of gases, where calcining continues of the larger size lumps which have not yet completely reacted, until the material cools to below the reacting temperature, at which point the batches are conveyed out of the kiln.

In Hyde, the suction induced flow of the combustion gases through the heating zone necessarily accelerates the combustion rate of the fuel, and results in incomplete mixing and combustion of the air and fuel, nonuniform temperatures and especially inefficiently high fuel consumption per unit material throughput, whereas the static nature of the closed soaking zone undoubtedly causes the carbon dioxide pressure in the limestone material being calcined to build up and stifle the system, and in turn prematurely terminate the dissociation reaction and instead regress to extensive recarbonation, such that the material will be nonuniformly and incompletely calcined.

Walker I (U.S. Pat. No. 2,015,642, issued 1935) calcines a batch of limestone, under vacuum and by electrical heat, in a closed chamber, after exhausting the air therefrom, to obtain pure form carbon dioxide. The material is passed by gravity from a top preheater zone through an intermediate constricted passage furnace zone, having an upper electrical resistance preheater operating at 1500°–1600° F. (816°–871° C.) and a lower arc electrode heater operating at 2600°–2650° F. (1427°–1454° C.), to a bottom discharge zone, while a 10–15 lb. vacuum is applied to the top zone for recovering in pure form the carbon dioxide liberated in the furnace zone after it has preheated the material in the top zone and been itself cooled thereby. The use of such high temperatures for calcining completely the entirety of the limestone batch, and the continuous supplying of the necessary energy therefor from an electrical source, involve costs that are prohibitive under current world wide energy crisis conditions, regardless of economic conditions and electrical energy availability as of 1935, or the fact that the recovered pure form carbon dioxide constitutes a salable secondary product.

Walker II (U.S. Pat. No. 2,068,882, issued 1937) calcines a batch of limestone, in the presence of injected dry steam as carbon dioxide diluent and by electrical heat, in a closed vertical shaft kiln to obtain pure form carbon dioxide, the steam taking the place of vacuum. The kiln includes a top steam condensation and carbon dioxide gas recovery zone, in indirect heat exchange enclosing relation to a separate closed preheater hopper, and partitioned by a water collection tray having upright entrance nipples from an intermediate reaction zone containing an upper preheater section, a middle multiple distribution thin flow path calcining section and a lower soaking section. The latter zone is separated by a flow controlling valve from a bottom discharge zone from which the lime product is periodically recovered via a discharge valve. Dry steam at 900° F. (482° C.), i.e., well above the critical or condensation temperature of water (which is believed to be 705.2° C. or 374° C., at 217.5 atm or about 3200 psi), is injected under pressure separately into the soaking section and the discharge zone, part of the liberated carbon dioxide and steam as a mixed gas is drawn off by a recycling fan from the top of the calcining section, passed through a separate heating zone containing an electrical heater and then returned as hot mixed gas, e.g. 50% each, at 2000° F. (1093° C.) to the bottom of the calcining section for recycled flow upwardly therethrough, and condensed steam and pure carbon dioxide are recovered from the top zone by a water pipe and suction fan operated gas pipe, respectively. An auxiliary electrical heater is located in the discharge zone to keep the temperature therein above the 900° F. (482° C.) injected steam temperature.

In operating the Walker II kiln, a limestone batch, upon being preheated in the hopper by the condensing steam and separating carbon dioxide, which enter the top zone through the tray nipples at about 300° F. (149° C.) and are recovered therefrom in cooled condition, is charged to the reaction zone for passage as a thin stream in turn through preheater, calcining and soaking sections in countercurrent to the injected steam and recycled electrically heated mixed gas, and the soaked calcined product at 1600° F. (871° C.) is periodically fed to the discharge zone upon operating its valve. The steam injected into the soaking section cools the calcined product to about 1600° F. (871° C.) and is superheated thereby before mixing with the hot mixed gas at about 2000° F. (1093° C.) returned from the electrical heater, yet it is said that the cool lime even if it decreases below 1600° F. (871° C.) will not recarbonate or form hydrated lime due to the high temperature and thus dry condition of the steam, and that the steam injected into the discharge zone and the auxiliary heater therein similarly prevent such recarbonation or hydration.

In the Walker II system, the pressure of the injected steam is said to reduce the carbon dioxide partial pressure and force it upwardly through the kiln, and if the steam is in high proportion, e.g. 80% steam and 20% carbon dioxide, it can be used for recycling the mixed gas and recovering the carbon dioxide without the recycling fan or suction fan, the steam also serving to take up any hydrogen sulfide stemming from impurities in the limestone and dust formed during the calcining. However, the entire charge must be calcined to completion by continuously supplying electrical energy and pressurized steam throughout the residence time. Thus, like Walker I, the operation involves prohibitive electrical energy costs plus additional costs for also providing very high temperature steam, wholly apart from the costs of operating any fans or using the extra steam to achieve proper flow of the gases within the system.

Walker III (U.S. Pat. No. 2,113,522, issued 1938) concerns a related kiln system to Walker II, but instead of supplying pressure injected high temperature steam, the carbon dioxide recovery suction fan is used to induce a vacuum in the batch operated closed kiln, after removing the air therefrom, such that the liberated carbon dioxide alone serves as the inert heating medium recycled through the separate heating zone containing the electrical heater. This operation suffers from the same prohibitive cost drawback as Walker I and Walker II in requiring a continuous supply of electrical energy for calcining the entire charge of limestone until all of it has been converted to lime.

Haas (U.S. Pat. No. 2,080,981, issued 1937) calcines a periodic supply of limestone, under vacuum and by indirect heat exchange, in a closed continuous vertical tube whose intermediate and partially inclined portion is enclosed in a separate furnace, to obtain pure form carbon dioxide. The tube is equipped with synchronously operating gas tight rotary metering valves separating it in turn into an introductory chamber, a preheater chamber, an inclined calcining chamber, a reserve pocket and a cooling chamber. The preheater and calcining chambers are enclosed in indirect heat exchange relation within a gas or oil fired furnace having its own combustion gas venting stack, and the cooling chamber is supplied with cooling air via a rotary check valve containing inlet pipe. Also, each chamber (except the pocket) has a rotary check valve containing suction pipe with a suction fan downstream of the check valve, the preheater and calcining chamber suction pipes leading to a pure carbon dioxide collection system, and the introductory and cooling chamber suction pipes leading to the furnace to supply it with preheated combustion air, including the cooling air normally fed via the inlet pipe to the cooling chamber plus that entering the system from the atmosphere when a batch of limestone is periodically charged through the first valve into the introductory chamber and when a batch of calcined lime is periodically discharged through the last valve from the cooling chamber, in the latter case during those intervals in which the cooling air inlet pipe is closed off by its valve and prior to receiving the next increment from the reserve pocket so as to prevent air seepage upwardly through the pockets or sectors of the rotary metering valve between the cooling chamber and reserve pocket.

In Haas, as limestone is periodically charged to the introductory chamber any entering air is removed via its suction pipe, whereupon the charge is metered into the preheater and calcining chambers in turn, both within the furnace, such that the liberated carbon dioxide is recovered via their respective suction pipes while the furnace combustion gases are merely vented to the stack. The calcined lime is then metered into the pocket for final metering into the cooling chamber from which it is periodically discharged via the last valve after being air cooled. This operation is costly because it uses less efficient indirect heat exchange for calcining the limestone with the sensible heat of the combustion gases in the separate furnace which are immediately vented to the stack, and because the entire charge must be continuously heated until complete calcination is effected, wholly apart from expenses in providing synchronously operating rotary metering and check valves, and suction fans, to recover pure form carbon dioxide.

Vogel (U.S. Pat. No. 2,784,956, issued 1957) covers a more recent vacuum calcining suggestion, as compared to the relatively antiquated above discussed proposals, which avoids the prohibitive cost of electrical heating as in Walker I, II and III, and the inefficiency of indirect heat exchange with combustion gas as in McTighe and Haas, in favor of direct contact heating with such combustion gases as in Niles and Hyde.

While similar to Niles, Vogel instead uses a producer gas fed central burner in the closed vertical shaft kiln, a suction fan to vent the spend combustion gases and liberated carbon dioxide from the top of the kiln, and a waste gas recycling system between the preheating and calcining zones to draw off some of the combustion gases and liberated carbon dioxide thereat at 900° F. (482° C.) under 90 psi steam injected induced flow for first removing the dust content in a dust trap and then recycling the same, relatively dust free, at 700° F. (371° C.) admixed with the injected steam to the central burner for extracting otherwise lost heat values, but thereby adversely enriching the system with recycled liberated carbon dioxide. Temperature control is effected via dampers at the suction fan and recycling system under the surveillance of thermocouple temperature indicators in conjunction with the steam and producer gas flows, such that the limestone is calcined in the calcining zone at about 1800°-2000° F. (982°-1093° C.) in the presence of steam and under partial vacuum. Here also, fuel and steam must be consumed for the entire time that the limestone is calcined and until all of it is substantially converted to lime, and under accelerated induced flow through the kiln due to the presence of the spent gas venting suction fan, in a manner analogous to Niles and Hyde.

In each of the foregoing proposals, the entire charge of the carbonate material is calcined to completion wile under the continuous application of electrical or combustion heating energy thereto throughout the operation. While stationary vertical shaft kilns, despite the above drawbacks, can be readily provided as sealed systems with vacuum suction, it will be appreciated that due to the continuous movement of horizontal rotary kilns it would be difficult, if not impossible, to provide them as vacuum suction operated sealed systems at the high order of magnitude calcining temperatures contemplated.

Lastly, Kinkade (U.S. Pat. No. 3,527,447, issued 1970) teaches that a still hot (e.g. 125°-150° F. or 52°-66° C.) batch of already low temperature kettle calcined (e.g. at 250°-500° F. or 121°-260° C.) gypsum, i.e. calcium sulfate, which has meanwhile been quenched with liquid water to form the dihydrate, can be subjected to indirect heating at 190°-200° F. (88°-93° C.) under a reduced pressure of about 0.3 in.Hg absolute (29 in.Hg vacuum) in a vacuum chamber to remove sufficient water therefrom to form the hemihydrate (i.e. plaster of paris, a man made product which never occurs in nature) in a condition which is said to be more resistant to change on aging than previously manufactured man made hemihydrate. The heating of the vacuum chamber is necessary to keep the attendant water above its dew point so it will not condense on the walls of the chamber and recontact the hemihydrate and thereby reform the dihydrate, but at the same time it must be such that the formation of the undesired anhydrite by overcalcination is avoided.

Of course, the chemical system of low temperature partial or complete dehydration and rehydration of calcium sulfate, as regards water of crystallization, is completely different from the carbon dioxide partial pressure influencing temperature controlled dissociation and recarbonation system of calcium carbonate according to the equilibrium equation I. Indeed, calcium sulfate is often present as a lime impurity, traceable to precursor sulfur impurities in the starting carbonate rock and/or in the combustion fuel which are oxidized during the calcination operation, and no doubt exists as a dead burned inactive anhydrite slagging constituent as a result of calcining the rock at the usual limestone calcining temperatures.

SUMMARY OF THE INVENTION

It is among the objects and advantages of the present invention to overcome the drawbacks and deficiencies of the prior art, and to provide an energy conserving limestone calcining system, especially as regards high calcium and/or dolomitic limestone, i.e. metallic carbonate, including a process and conjoint apparatus for successive stage treatment of limestone to calcine the calcium carbonate, and/or magnesium carbonate, i.e. metallic carbonate, content substantially completely to calcium oxide, and/or magnesium oxide, i.e. metallic oxide, and carbon dioxide with the consumption of considerably less heating energy than otherwise, regardless of the type fuel or heating method used, and particularly in part under a locally reduced partial pressure of carbon dioxide whereby to reduce the overall heat energy requirements of the calcination.

It is among the additional objects and advantages of the present invention to provide a system of the foregoing type, in which the calcining may be carried out such that at least about 25% heat energy may be saved, and in which lower kiln temperatures may be used as compared with existing systems, and such that less expensive refractory linings can be used in the kiln than in existing systems.

It is among the further objects and advantages of the present invention to provide such a system in which, in consequence of the permitted calcining at lower temperatures than in existing systems, other things being equal, a softer lime product can be produced which has greater porosity and higher surface area than that produced in existing systems.

It is among the still further objects and advantages of the present invention to provide a system of the stated type which is such that it can be retrofit to most existing kilns.

It is among the still further objects and advantages of the present invention to provide such a system, in which the calcining may be carried out in a two step sequence, such that the limestone is partially calcined by heating the limestone at ordinary atmospheric pressure in a first step, and thereafter the calcining is substantially completed in a second step under a vacuum, to reduce the partial pressure of the attendant carbon dioxide locally, while using for the completion of the calcining the sensible heat contained in the only partially calcined limestone from the first step, without the need for additionally heating the limestone in the second step, whereby to reduce the overall calcination time and in turn the heat energy to the extent of preferably at least about 25%, and consequently provide a corresponding saving in the production costs.

BRIEF DESCRIPTION OF THE DRAWINGS

Other and further objects and advantages of the present invention will become apparent from the within specification and accompanying drawings, in which:

FIGS. 5 and 6 are schematic side and interior end views of a portion of an energy conserving limestone calcination apparatus according to the present invention, showing the discharge end of a horizontal rotary kiln of the type shown in FIG. 4 in specific relation to a calcining vacuum chamber arrangement including two alternately used separate vacuum chambers.

DETAILED DESCRIPTION OF THE INVENTION

Figure 1:
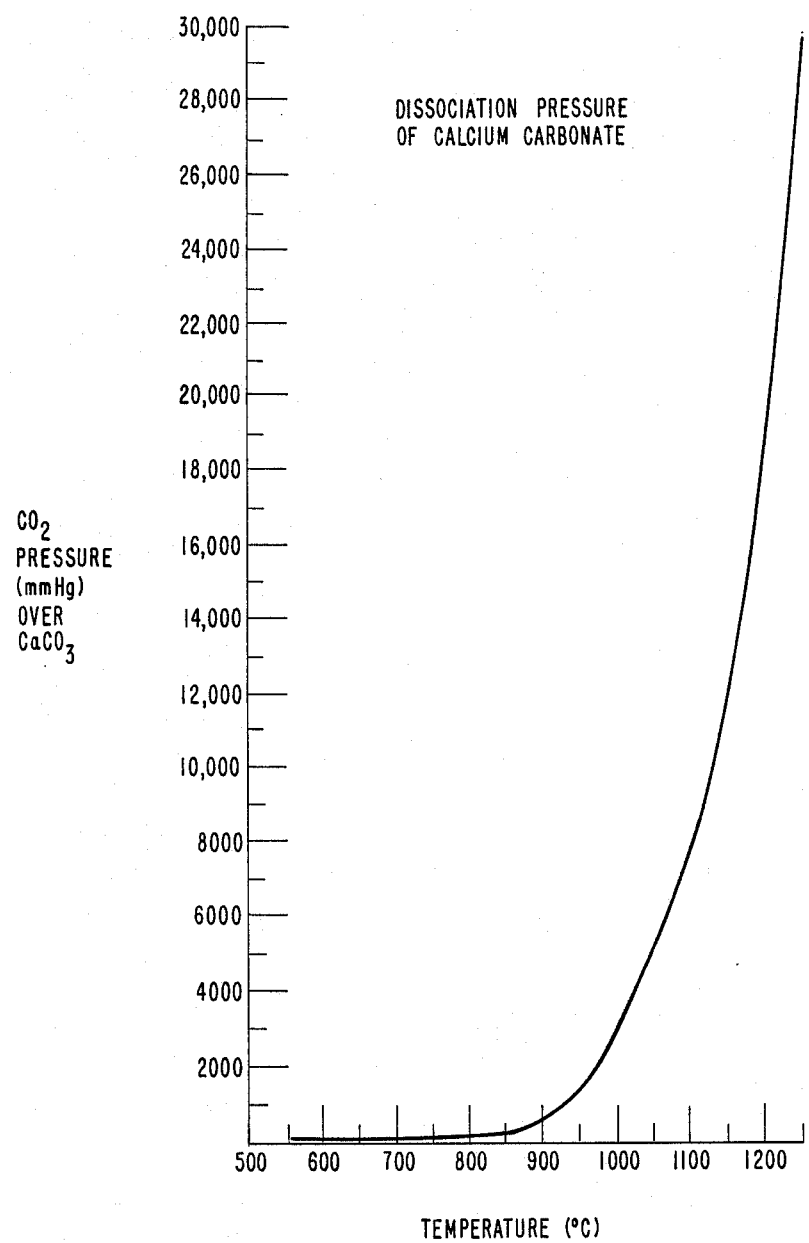
FIG. 1 is a schematic view of a graph showing the classic fixed relation between the temperature and partial pressure of carbon dioxide over a wide range for the calcination of calcium carbonate in accordance with the dissociation parameters of the equilibrium equation between limestone on the one hand and lime and carbon dioxide gas on the other hand, pursuant to LeChatelier's principle.

According to a first main aspect of the present invention, a limestone calcining process is advantageously provided for the successive stage calcination of limestone comprising two steps.

In the first step, the limestone is heated sufficiently to achieve partial conversion, such as at least about 50% or 60%, and generally more than, for instance, about 60%, partial conversion of the calcium carbonate present to calcium oxide and carbon dioxide and to form a partially calcined hot mass containing sufficient retained heat for subsequently, e.g. independently, substantially completing the conversion of the remaining unconverted limestone therein.

Thereafter, in the second step, the conversion of the limestone in the hot mass to calcium oxide and carbon dioxide is, e.g. independently, separately substantially completed by such retained heat while, e.g. locally, subjecting the partially calcined hot mass to a vacuum sufficiently to remove substantially completely the resultant carbon dioxide and for a duration sufficient to achieve such substantially complete conversion of the limestone and thereby provide a substantially completely calcined hot mass.

Only generally at least about 50-60%, and more particularly between about 50-85% or 60-85%, e.g. between about 65-85%, preferably between about 70-80%, more preferably between about 72-78%, and especially about 75%, partial conversion of the limestone is achieved in the first step, and concordantly the remainder of the conversion is achieved in the second step.

The limestone may be calcite, dolomite and/or magnesite, or the like type metallic carbonate rock.

In conjunction therewith, generally the limestone is heated to or maintained at a temperature of only for instance at least about 1700° F. (927° C.), generally between about 1700°-2700° F. (927°-1482° C.), preferably between about 1700°-2100° F. (927°-1149° C.), more preferably between 1800°-2000° F. (982°-1093° C.), and especially between about 1800°-1850° F. (982°-1010° C.), in the first step for high throughput efficiency, in dependence on the purity of the limestone used, and concordantly the remainder of the conversion is carried out in the second step with the retained heat in the hot mass from the first step corresponding to such temperature.

In particular, the first step may be effected at ordinary ambient or normal atmospheric pressure in a rotary kiln zone or first zone and the second step may be effected in a separate vacuum zone or second zone, and the partially calcined hot mass may be recovered from the rotary kiln zone and fed to the vacuum zone for completing the conversion of the limestone in the vacuum zone.

In this regard, the second step may be alternately effected in a given one of at least two separate vacuum subzones, such that the recovered partially calcined hot mass is fed in a corresponding batch amount alternately to a corresponding subzone.

More specifically, an energy conserving limestone process of the foregoing type may be provided which comprises, in a first step, supplying sensible heat to limestone to heat to and/or maintain the limestone at a temperature sufficient to dissociate the calcium carbonate present to calcium oxide and carbon dioxide, e.g. at about normal atmospheric pressure, and thereby form a hot mass and liberated carbon dioxide, in accordance with an equilibrium dissociation reaction which is dependent on the partial pressure of carbon dioxide, and for a duration sufficient to achieve at least about 60% partial conversion of the limestone by the sensible heat in the hot mass and thereby provide a retained sensible heat containing partially calcined hot mass in which the retained heat is sufficient for subsequently independently substantially completing the conversion of the remaining unconverted limestone in the hot mass, while removing the liberated carbon dioxide from the vicinity of the hot mass at a rate sufficient to maintain the carbon dioxide partial pressure in the first step below the corresponding equilibrium pressure at said temperature.

In turn, the process further comprises thereafter, in a second step, continuing the dissociation reaction for separately substantially completing the calcining of the limestone, substantially in the absence of supplying further sensible heat to the partially calcined hot mass, by subjecting the sensible heat containing partially calcined hot mass, e.g. locally, to a vacuum sufficiently to remove substantially completely the further liberated carbon dioxide and for a duration sufficient to achieve substantially complete conversion of the limestone independently by the retained sensible heat contained in the partially calcined hot mass, and thereby provide a substantially completely calcined hot mass.

Generally, therefore, the present invention contemplates an overall carbonate rock calcining process which comprises, in a first step, heating metallic carbonate, e.g. calcite, dolomite and/or magnesite, sufficiently to achieve sufficient partial conversion thereof to metallic oxide, e.g. calcium oxide or magnesium oxide, and carbon dioxide to form a partially calcined hot mass containing sufficient retained heat for subsequently substantially completing the conversion of the remaining unconverted metallic carbonate therein.

Thereafter, in a second step, the overall process further comprises separately substantially completing the conversion of the metallic carbonate in the hot mass to metallic oxide and carbon dioxide by such retained heat while subjecting the partially calcined hot mass to a vacuum sufficiently to remove substantially completely the resultant carbon dioxide and for a duration sufficient to achieve such substantially complete conversion of the metallic carbonate and thereby provide a substantially completely calcined hot mass.

Hence, preferably in this overall process, at least about 50% or 60% partial conversion of the metallic carbonate is achieved in the first step, and the metallic carbonate rock is heated to a temperature of at least about 1700° F. (927° C.) in the first step.

According to a conjoint second main aspect of the present invention, a limestone calcining apparatus is advantageously provided for the successive step or stage calcination of limestone.

Such apparatus comprises a limestone calcining kiln for heating limestone, e.g. at about normal atmospheric pressure, for partially converting the limestone to the corresponding metallic oxide, e.g. calcium oxide, and carbon dioxide, and having a kiln discharge outlet for recovering the partially calcined limestone in the form of a hot mass from the kiln, plus closable calcining vacuum chamber means separate from and adjacent the kiln discharge outlet and arranged for receiving therefrom the recovered hot mass for completing the converting of the limestone to the corresponding metallic oxide, e.g. calcium oxide, and carbon dioxide and for applying a vacuum, e.g. locally, thereto for removing such carbon dioxide, as well as heat retaining hood means operatively enclosing the kiln discharge outlet and the vacuum chamber means for minimizing heat loss from the hot mass in the vicinity of the kiln discharge outlet and in the vacuum chamber means.

For instance, the vacuum chamber means may include closable entrance means for receiving the hot mass from the kiln discharge outlet, and closable exit means for removing the calcined vacuum applied hot mass therefrom, as well as vacuum applying means adapted to be connected to a vacuum source for applying a vacuum, e.g. locally, to the vacuum chamber means when the hot mass is received therein and the entrance means and exit means are closed.

Favorably, cooling means are provided outside of the hood means and flow connected thereto adjacent the exit means of the vacuum chamber means for receiving and cooling the hot mass upon removal thereof via the exit means. For instance, the cooling means may include a rotary contact cooler device for rotating the hot mass and adapted to receive a flow of cooling gas, such as air, for contact cooling of the hot mass during such rotation.

Preferably, the vacuum chamber means may include at least two separate upright vacuum chambers, each having an appropriately located vacuum applying pipe, a closable upper entrance and a closable lower exit. Also, diverter means may be provided in the hood means at the kiln discharge outlet for alternately directing the hot mass to the corresponding entrances of the vacuum chambers, and chute means may be provided in the hood means for conveying the hot mass from the corresponding exits of the vacuum chambers to the cooling means.

Conveniently, by pass flow directing means may be provided in the hood means adjacent the kiln discharge outlet and operatively arranged relative to the diverter means for by pass flow of the hot mass directly from the kiln discharge outlet thereto, and the hood means may include a hood outlet for receiving such by pass flow of the hot mass for discharge from the hood means.

In particular, the kiln may be in the form of a rotary kiln having a kiln discharge end, such that the hood means operatively encloses the kiln discharge end in relative rotational sealing relation therewith.

Referring to the drawings, and initially to the graph of FIG. 1, in connection with the equilibrium equation I and the vapor pressure Table 1 above, it is seen by extrapolation that roughly the vapor pressure or partial pressure of carbon dioxide almost doubles from about 1 atmosphere absolute (760 mmHg) to almost 2 atmospheres absolute (1520 mmHg) as the temperature increases an increment of only about 50° C. (90° F.) from about 900° C. (1652° F.) to about 950° C. (1742° F.), and again almost doubles from about 2 atmospheres absolute to almost about 4 atmospheres absolute (3040 mmHg) as the temperature increases thatsame 50° C. (90° F.) increment from about 950° C. (1652° F.) to about 1000° C. (1832° F.).

Figure 2:
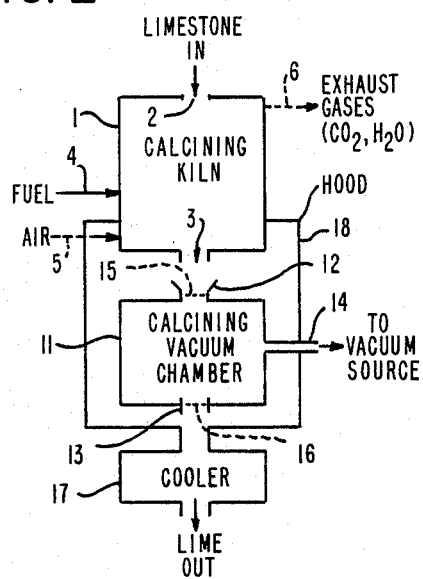
FIG. 2 is a schematic view illustrating an energy conserving limestone calcining system according to the present invention, and including a calcining kiln for carrying out the partial calcining of limestone in a first step or zone, and a calcining vacuum chamber arrangement for completing the calcining of the limestone under a vacuum in a second step or zone, plus a cooler for cooling the completely calcined resultant product.
Figure 3:
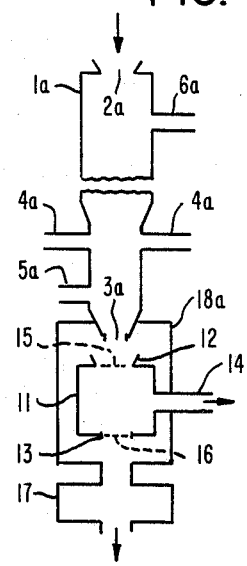
FIG. 3 is a schematic view similar to FIG. 2, and illustrating a calcining system which includes a vertical shaft lime kiln for carrying out the first step partial calcination of the limestone.
Figure 4:
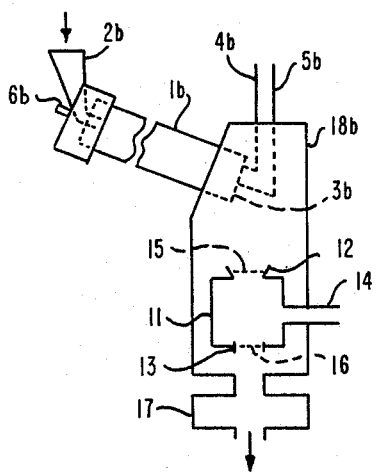
FIG. 4 is a schematic view similar to FIG. 2, and illustrating a calcining system which includes a horizontal rotary lime kiln for carrying out the first step partial calcination of the limestone.

In a known lime kiln arrangement, as partially shown in FIG. 2, be it of the vertical shaft kiln or horizontal rotary kiln type, as more specifically partially shown in FIGS. 3 and 4 respectively, it is clear from the foregoing that considerable excess heat is needed to overcome the partial pressure of carbon dioxide and drive the calcination to completion per the equilibrium equation I, i.e. by reducing the carbon dioxide partial pressure at the expense of excess heat energy input.

By way of the present invention, on the other hand, the limestone calcination is carried out with locally reduced partial pressure of carbon dioxide to reduce in turn the heat energy requirements of the calcination, instead of by increased heat energy and/or temperature and/or calcining duration as in the past. This is achieved specifically by dividing the operation into a two successive step or stage system, and using vacuum locally in the second step or stage to complete the calcination of the partially calcined limestone from the first step or stage solely by way of the retained sensible heat content already contained in the partially calcined limestone.

Consequently, this will decrease the overall cost of the otherwise energy intensive process by concordantly decreasing the total time or duration during which heat energy from an extraneous source, e.g. fuel for direct or indirect firing of the limestone, must be supplied in a positive manner in the stone or mass of starting calcium carbonate.

In turn, this will concomitantly decrease the quantity of such heat energy, e.g. fuel, and/or the temperature of the calcining operation.

Briefly, according to the system comprising the conjoint process and apparatus aspects of the present invention, limestone is heated to a point in time such that for instance only more than about 60%, e.g. 75%, of the limestone is calcined at about normal atmospheric pressure in the first step or stage in a normal calcining heat supplying kiln zone, and the remaining, e.g. 25%, calcination is accomplished by conserving the energy, i.e. retained sensible heat energy, already in the stone or hot mass and reducing the partial pressure of the carbon dioxide being generated or liberated by means of a vacuum locally applied in the second step or stage in a calcining vacuum chamber assembly.

This can be conveniently accomplished by attaching or arranging one or more separate or discrete vacuum holding chambers constituting the calcining vacuum chamber assembly, at the discharge end or outlet of the lime kiln constituting the normal calcining heat supplying kiln zone, allowing the only partially calcined lime, e.g. at generally about 1800°-2000° F. (982°-1093° C.), or at such other lower or higher temperature at which the first step or kiln zone partial calcining is carried out, to fill the corresponding vacuum holding chamber, and then placing the chamber locally under vacuum sufficiently to achieve constant or continuous removal of the attendant carbon dioxide, e.g. as it is generated or liberated, and for a selective or designated time or duration sufficient to complete substantially the calcination of the attendant remaining calcium carbonate to calcium oxide at the attendant temperature.

The determining factor is that the hot mass from the first step or zone which is intentionally only partially calcined must possess sufficient retained sensible heat energy, regardless of its temperature or degree of partial calcining, for subsequently generally independently, substantially completing the calcining of the remaining uncalcined limestone in the hot mass quantity fed to the second step or zone, under the applied vacuum in the second step or zone, so that the latter achieves substantial completion of the calcining of the starting quantity of the limestone, e.g. on a unit rate or weight basis, without the need for independently supplying thereto in a positive manner further heat energy from an extraneous source, as required in the former or first step or zone.

It will be appreciated that partial calcining in the context of the present invention means incomplete calcining whose percentage of incompletion is equal to the percentage saving in heat energy, or stated another way, whose percentage of partial completion directly defines by difference such percentage saving in heat energy, e.g. one third incompletion equals one third energy saving, or two thirds partial completion by difference defines a one third energy saving.

Since the pertinent equilibrium carbon dioxide partial pressure is a constant at a given calcining temperature, the temperature of the hot mass in the second step or zone at any given time self defines such pressure below which the vacuum degree or level must be maintained in the second step or zone at that temperature, in order to assure that the calcining of the remaining content of the calcium carbonate therein is continued until that content is substantially completely calcined to calcium oxide and carbon dioxide, and that the carbon dioxide in turn is substantially completely removed from the site or vicinity of the hot mass of calcium oxide so as to prevent reformation of calcium carbonate under the existing temperature and pressure conditions in the second step or zone.

On the other hand, since the percentage of partial calcining or of incompletion of the calcining is a function of the residence time of the limestone in the first step or zone, it self defines the heat energy consumed to reach that point and to provide the temperature at which the hot mass is fed to the second step or zone, and in turn self defines by difference the percentage saving in heat energy, as earlier discussed, in terms of a corresponding percentage saving in calcining time of the limestone in the first step or zone.

For example, laboratory tests using equal portions of the same limestone sample were heated to the same calcination point (as measured by the residual carbonate content), with and without the application of a vacuum, per the present invention feature, and the following results were obtained:

TABLE 2

| Limestone Calcination Comparison Experimental Results | | |
|---|---|---|
| Condition | Time, Temp. °F. (°C.) | Residual Ca CO$_3$ |
| Without Vacuum (Comparison) | 20 minutes, 1850° F. (1010° C.) | .69% |
| With Vacuum (Invention) | 15 minutes, 1850° F. (1010° C.) | .80% |

As Table 2 demonstrates, the use of a vacuum per the present invention results in a reduction of 25% calcination time, compared to the usual condition which omits the use of a vacuum, and this directly relates to a corresponding 25% saving in heat energy or fuel otherwise needed to drive the reaction to the right side per the equilibrium equation I.

It will be noted from the graph of FIG. 1 that at such temperature of 1850° F. (1010° C.), the partial pressure of carbon dioxide is extremely high since, by comparison extrapolation, at 1832° F. (1000° C.) the carbon dioxide partial pressure is around 2700 mmHg, whereas specifically at 1719° F. (937° C.) it is 1345 mmHg (1.77 atm. abs.) and at 1980.5° F. (1082.5° C.) it is 6758 mmHg (8.89 atm. abs.), as indicated numerically in Table 1.

Hence, the experimental results set forth in Table 2 are believed to show an unexpected or surprising difference in terms of the above discussed considerations.

In actuality, the results of Table 2 are taken from a series of experiments carried out with cut limestone cubes in order to provide specimens the mass and weight of each of which was as nearly identical to the others, so as to get acceptable reproducible test results, in accordance with the procedure of the following Example 1:

EXAMPLE 1

A laboratory tube furnace (Lindberg, Model 55035, 115 volts, 800 watts) was used which was provided with suitable heat controls for maintaining the temperature at a selectively preset temperature level. The main part of the furnace was 13½" long and 7" deep and of suitable height for accommodating the muffle part of the furnace which consisted of a ceramic tube of ¾" diameter and 18" length such that when movably inserted into the main part of the furnace, the tube was longer than the main part by a couple of inches at each end (i.e. about 2¼" of the tube being exposed at each end). Normally, the movable tube is open at both ends and thus subject to normal ambient pressure or air pressure.

A vacuum was obtained by closing one end of the ceramic tube with a suitable high temperature plug or stopper and attaching a hose to the other end connected in turn to a small Vacu/trol electric pump capable of pulling about 635 mmHg vacuum or suction.

Preliminary experiments (not shown) were conducted using limestone of good quality (i.e. calcite), crushed and screened to small lumps, $-\frac{3}{8}" \times +\frac{1}{4}"$ in size, with each test made with a charge of 6 lumps picked so that the total weight of each charge was 5.0 grams. However, after many calcining attempts to obtain replicate results of the degree or percent of carbonate remaining after the calcining, it became apparent that merely using lumps of different individual sizes was not precise enough for obtaining acceptably accurate data on such a small or laboratory scale testing procedure.

Consequently, small cubes of the same type limestone (i.e. calcite) were instead carefully cut using a diamond saw so that each cube was very close to being precisely the same size, i.e. 6–7 mm per side, and each weighing 4.8 grams. In this actual experimental procedure, two such cubes were used for each burn or calcining test, and each pair was matched exactly as to weight with a companion pair of cubes for making duplicate tests. In this way, good comparison results were in fact actually obtained.

All calcining tests were made after the furnace was brought to the selected starting temperature of 1850° F. (1010° C.) and allowed to remain at equilibrium for 15 to 30 minutes.

To start the calcine test, two limestone cubes were pushed to the center of the so heated open ended ceramic tube just over the point of the thermocouple in the main part of the furnace, and the timing of the calcining was started. At the end of the predetermined calcining time limit selected, the two cubes were pushed out of the ceramic tube and allowed to cool to ambient in a tightly closed metal container (sealed cooling). The cold lime product cubes were then pulverized to a powder quickly and then analyzed for $CO_2$ with a Leco carbon analyzer.

The above procedure for the tests involving first stage partial calcining followed by second stage vacuum calcining, according to the present invention, was altered slightly, i.e. at the end of the first stage partial calcining predetermined time limit selected, the furnace power was turned off, and the ceramic tube was moved one inch to place the two partially calcined cubes in a slightly lower temperature zone relative to the main part of the furnace and thereby simulate the loss of some heat in transferring the partially calcined lime product from a calcining unit or zone to a separate and adjacent vacuum chamber or zone. In this case, when the declining furnace temperature under the applied vacuum reached 1500° F. (816° C.), the two cubes were removed and analyzed per the above procedure. All vacuum tests were carried out at the same level of vacuum, i.e. at 450 mmHg, with the plugged ceramic tube connected to the Vacu/trol electric pump via the hose at its open end.

It should be noted that the calcining temperature of 1850° F. (1010° C.) was chosen to enable the calcining tests to be carried out at a reasonably fast burning or calcining time for the small size limestone cube specimens so as to yield a lime product that was generally between 0.5% and 1.0% in residual carbonate (i.e. a lime cube having a 0.5 to 1.0% carbonate core). Hence, the temperature-time relationship used in these experimental comparision tests does not necessarily simulate, nor is it intended even to suggest, preferred or actual commercial practice. For example, in rotary kilns, actual commercial practice normally contemplates calcining at higher temperatures such as in the broad range of 2100° F. (1149° C.) to 2700° F. (1482° C.) for high calcium lime, i.e. limestone of good quality (calcite) as used in these tests.

The results of 12 experimental tests, in which the air calcining under furnace energy heating was carried out at 1850° F. (1010° C.) in each test, and the vacuum calcining was carried out at 450 mmHg in each vacuum test, are shown in the following comprehensive Table 2A:

TABLE 2A

Limestone Calcination Comparison Experimental Tests

| Test | Condition | Heating Time | Cool/Vac. Condition | Residual $CaCO_3$ | Avge. |
|---|---|---|---|---|---|
| (Comparison) | | | | | |
| 1 | Without Vacuum | 20 min. | Sealed Cooling | 0.65% | 0.67% |
| 2 | Without Vacuum | 20 min. | Sealed Cooling | 0.69% | |
| 3 | Without Vacuum | 19 min. | Sealed Cooling | 0.52% | 0.53% |
| 4 | Without Vacuum | 19 min. | Sealed Cooling | 0.54% | |
| 5 | Without Vacuum | 17 min. | Sealed Cooling | 17.01% | 15.8% |
| 6 | Without Vacuum | 17 min. | Sealed Cooling | 14.56% | |
| 7 | Without Vacuum | 14 min. | Open Tube Cooling 16 min. | 0.59% | 0.63% |
| 8 | Without Vacuum | 14 min. | Open Tube Cooling 16 min. | 0.67% | |
| (Invention) | | | | | |
| 9 | With Vacuum | 15 min. | Vac. Tube 13 min. | 0.80% | 0.88% |
| 10 | With Vacuum | 15 min. | Vac. Tube 13 min. | 0.95% | |
| 11 | With Vacuum | 14 min. | Vac. Tube 16 min. | 0.48% | 0.48% |
| 12 | With Vacuum | 14 min. | Vac. Tube 16 min. | 0.48% | |

Whereas the results (not shown) of using randomly sized pieces of limestone were not very consistent, it is clear from Table 2A that the use of limestone precisely cut with a diamond saw into cubes of 6–7 mm per side size and paired off in equal weights of 4.8 grams gave better or more consistent results, for instance with tests 1 and 2 showing that the conventional air calcining was repeatable and the vacuum tests showing that the second stage continued vacuum calcining according to the present invention was also repeatable.

It should be noted that tests 9 and 10 (invention) were carried out such that after 15 minutes first stage heating, the furnace was turned off and a vacuum was applied to the then plugged ceramic tube in the second stage for an additional 13 minutes (28 minutes total calcining) with the ceramic tube being moved 1 inch from its earlier mid position to simulate loss of heat in transferring the partially calcined lime product from the first stage air calcining zone to the second stage vacuum calcining zone.

Similarly, tests 11 and 12 (invention) were carried out such that after 14 minutes first stage heating, the furnace was turned off and a vacuum was applied to the then plugged ceramic tube in the second stage for an additional 16 minutes (30 minutes total calcining) at a final temperature of 1500° F. (816° C.) with the ceramic tube being moved 1 inch as in the case of tests 9 and 10 for the same reason.

By way of a further comparison, unlike the sealed cooling of the air calcined produce per tests 1 to 6, the comparison tests 7 and 8 were carried out such that after 14 minutes heating, the furnace was turned off and the air calcined product merely air cooled in the unplugged ceramic tube for an additional 16 minutes (30 minutes total air calcining and final air cooling) with the ceramic tube being moved 1 inch as in the case of the vacuum tests 9 to 12 (invention).

It is clearly apparent from the results of Table 2A that the vacuum calcining concept of the present invention results in a significant saving in energy. By reducing the partial pressure of the attendant and generating carbon dioxide at the calcining temperature, the limestone continues to calcine at an accelerated rate.

Apart from the fact that the precisely cut cubes of limestone definitely provide more consistent results which are fundamentally better than in the case of random size pieces, tests 1 and 2 as compared to tests 5 and 6 show that in the case of conventional air calcining, while it took 20 minutes of heating to calcine the limestone at 1850° F. (1010° C.) to an acceptably low calcium carbonate residue of 0.65% or 0.69% average 0.67% residue, by cutting down the heating time by 3 minutes to 17 minutes for a 15% reduction in heating time or heating energy (i.e. 3/20), an unacceptable large residual core of about 17.01% or 14.56%, average 15.8% residue or core, was left in the limestone.

On the other hand, using a vacuum per tests 9 to 12 (invention), the heat applied calcining took place in only 14 or 15 minutes, rather than 20 minutes as in the case of tests 1 and 2, to achieve an acceptably low calcium carbonate residue for a 25% saving in heating time or heating energy at such 5 minute saving in time (i.e. 5/20).

Selective data from Table 2A show the following per Table 2B:

TABLE 2B

| Limestone Calcination Selective Data | | |
|---|---|---|
| Residual CaCO$_3$ | Furnace Power On Heating Time | Condition |
| 0.65% | 20 min. | No Vacuum (Test 1) |
| 0.69% | 20 min. | No Vacuum (Test 2) |
| 0.48% | 14 min. | With Vacuum (Test 11) |
| 0.48% | 14 min. | With Vacuum (Test 12) |
| 0.60% | 19.5 min. | No Vacuum |

TABLE 2B-continued

| Limestone Calcination Selective Data | | |
|---|---|---|
| Residual CaCO$_3$ | Furnace Power On Heating Time | Condition |
| | | (Av. 4 tests, Tests 1 to 4) |
| 0.68% | 14.5 min. | With Vacuum |
| | | (Av. 4 tests, Tests 9 to 12) |
| 15.8% | 17 min. | No Vacuum |
| | | (Av. 2 tests, Tests 5 to 6) |

Even as between the open tube prolonged 16 minute tests 7 and 8 and the 16 minute vacuum tests 11 and 12 (invention), after the same 14 minute heat applied air calcining, based on the 0.63% average core residue per tests 7 and 8 and the 0.48% average core residue per tests 11 and 12, for a residue difference of 0.15%, use of the vacuum per the present invention concept results in a 24% reduction in the core size (i.e. 0.15/0.63). Upon extrapolation to commercial scale limestone lump sizes, such 24% core size order of magnitude reduction takes on particular significance.

Understandably, the above distinctions as to the concept of the present invention which apply to high calcium limestone or calcite in Example 1 and Tables 2, 2A and 2B, also apply analogously to dolomite, magnesite or other type metallic carbonate rock calcination.

The system for carrying out the features of the present invention may be appreciated from the schematic installation shown in FIG. 2. This includes the usual calcining heat supplying kiln zone or refractory lined lime kiln 1 having a feed end or inlet 2 and a discharge end or outlet 3, which in the typical known operation is direct flame fired by fuel such as natural gas, producer gas, fuel oil, powdered coal or the like, or is indirectly heated by supplying hot gases such as combustion gases thereto from an upstream fire box or the like, fed through heat energy supply line 4.

In the known operation, the limestone lump material such as in the form of stone or rock granules or particles of desired size is fed to the kiln 1 through the feed inlet 2, air for combustion is typically fed through the discharge outlet 3, and fuel is fed through supply line 4 and burns with the air to supply heat energy to the limestone, which after being calcined is recovered from the discharge outlet 3, while the gaseous combustion products or exhaust gases leave the kiln 1 through the feed inlet 2.

Alternatively, the air may be separately supplied via an air supply line 5 at some appropriate point and/or the exhaust gases may be separately withdrawn via an exhaust gases line 6 at some other appropriate point (both shown in phantom).

The limestone thus passes more or less incrementally or continuously through the kiln 1 in the direction of the arrows from the feed inlet 2 to the discharge outlet 3 generally in countercurrent to the supplied air and fuel combustion gases, and remains in the kiln 1 at about normal atmospheric pressure sufficiently to complete substantially the calcining of the calcium carbonate content in the stone or rock feed to produce calcium oxide and carbon dioxide.

The liberated carbon dioxide is taken up in the gaseous combustion products which flow in countercurrent relation to the passage of the limestone and which are exhausted via the feed inlet 2 or the separate exhaust gases line 6.

The incoming air which is fed via the discharge outlet 3 or the separate air supply line 5 is in any case conveniently preheated by the calcined limestone hot mass leaving the discharge outlet 3 in view of the countercurrent flow relationship provided.

In the known operation, the degree or rate of removal of the liberated carbon dioxide from the vicinity of the hot mass of the limestone being calcined is dependent upon the corresponding degree or sufficiency of the mixing of the air and fuel, plus the rate of flow of the air and fuel and the gaseous combustion products through the limestone granule or particle lump mass, and conjointly on the degree or rate of flow (throughput) of the limestone itself since these gaseous and solid flows are in countercurrent relation.

Obviously, too little air will cause incomplete combustion of the fuel, uneven heat distribution and excessive temperature, and too much air will cause cooling in the kiln and heat loss in the exhaust gases still containing hot but unused oxygen values.

For heat energy efficiency, the individual air and fuel and conjoint gaseous combustion products flow rates must be sufficiently slow enough for the generated or supplied heat energy (depending on the heat value of the particular fuel) to be imparted to the limestone.

Otherwise, the exhaust gases leaving the kiln 1 via the feed inlet 2 or the exhaust gases line 6 will either be incompletely burned or their contact with the limestone will be insufficient to transfer the mazimum of their heat content thereto, whereupon such exhaust gases will be incompletely used exhaust gases.

In either case, the result would be a waste of heat energy.

This could only be partly offset by the added burden of recovering such incompletely used gases for some extraneous purpose, such as for physically extracting their remaining heat values, e.g., by indirect heat exchange. However, such expedient would be of only minor benefit considering the high cost of fuel and the limited efficiency of operations and equipment capable of physically extracting heat values residually from exhaust gases.

On the other hand, any attempt at recovering such incompletely used exhaust gases for the indigenous purpose of chemically extracting there remaining heat values, e.g., by direct return for use as recycled combustion air or as preheated ballast or diluent for carrying off carbon dioxide from the site or vicinity of the calcining limestone, would enrich the gaseous phase in the kiln 1 with further accumulating carbon dioxide, causing an increase in the carbon dioxide concentration and thus an increase in its partial pressure in a manner specifically detrimental to the desired shift to the right side of the equilibrium equation I, as earlier pointed out.

Likewise, even where the corresponding flow rates of such gases are efficiently slow enough and uniformly proportioned and mixed to achieve maximum combustion as well as maximum transfer of generated heat energy to the limestone in the kiln 1 prior to withdrawal of such gases as exhaust gases via the feed inlet 2 or the exhaust gases line 6, the flow rate of the limestone through the kiln 1 in countercurrent relation to such gases must be coordinated or matched therewith.

Otherwise, if the flow rate of the limestone is not sufficiently slow, incomplete calcining of the calcium carbonate will occur and the hot mass exiting via the discharge outlet 3 will constitute a defective commercial product, whereas if such limestone flow rate is too slow, overburning or at least dead time or an overextended residence time of the limestone in the kiln 1 will result.

Overburned limestone represents an analogous defective commercial product, while an overextended time represents a direct cost inefficiency item since it means that extra fuel is being burned without providing any benefit regarding the further heating of the already (relatively prematurely) substantially completely calcined limestone still in the kiln 1.

On the other hand, if the corresponding flow rates of the air and fuel and gaseous combustion products are too slow relative to that of the limestone, the limestone will not be supplied with sufficient heat energy, and thus the required residence time of the limestone in kiln 1 must be extended to avoid underburing, which expedient may not itself be sufficient unless the actual temperature maintained by such too slow flow rates of the air and fuel and gaseous combustion products is sufficient for accommodating an industrial scale throughput of limestone on a practical per unit time basis.

Of course, the slower the flow of the gases through the limestone the greater the tendency for the partial pressure of the generated or liberated carbon dioxide to increase disadvantageously as the concentration thereof builds up in the gaseous phase in the kiln 1.

Each of the foregoing flow rate factors is independently influential on the cost efficiency of the overall operation, in terms of fuel consumption per unit time and per unit limestone calcined, as well as in terms of the degree of calcining, e.g., underburned or overburned, and the associated quality of the commercial product obtained.

More important, as regards the role of the partial pressure of carbon dioxide on the efficiency of the dissociation reaction according to the equilibrium equation I, resort to positive suction discharge of the exhaust gases, e.g., via the separate exhaust gases line 6, to facilitate removal of generated or liberated carbon dioxide taken up by such gases, would not result in greater efficiency since, aside from the earlier discussed sponge effect of the coating of the calcium oxide as first formed on the limestone lumps, this would merely introduce a further complicating factor in the system constituting a separate source of disturbing imbalance.

This is because such positive suction discharge of the exhaust gases would increase the rate of flow of such gases through the kiln 1, such that the air and fuel would be incompletely burned and/or their gaseous combustion products would not remain in contact with the limestone sufficiently to transfer the maximum of thier heat content to the limestone, leading to extraneous heat energy inefficiency and extraneous higher fuel costs, regardless of the corresponding flow rate of the limestone through the kiln 1.

In this regard, correspondingly increasing the flow rate of the limestone would produce an incompletely calcined objectionable commercial product, whereas decreasing the limestone flow rate might lead to overburning but in any case would aggravate the extraneous heat energy inefficiency and extraneous higher fuel costs since the thereby prolonged residence time of the limestone in the kiln 1 would further prolong the high relative fuel consumption per unit time and per unit limestone calcined, traceable to the use of such positive suction discharge of the exhaust gases from the kiln 1.

Such disadvantageous fuel consumption inefficiency results, traceable to use of positive suction discharge of the exhaust gases from the kiln 1, would clearly overshadow any theoretical benefit in accelerating the removal of generated or liberated carbon dioxide from the site or vicinity of the hot mass of limestone being calcined in the kiln 1.

This is because, despite the reversible nature of the equilibrium equation I, the desired high order of magnitude temperatures required for industrial scale per unit calcined limestone throughputs necessitate continuous consumption of correspondingly high order of magnitude quantities of comparatively expensive fuel as heat energy source to maintain such high order of magnitude temperatures continuously in the kiln 1 on a per unit time basis, considering that the basic limestone calcining operation is a continuous operation.

Since such calcining operation is normally conducted on a 24 hour a day uninterrupted schedule, the fuel as heat energy source is concomitantly consumed on the same 24 hour a day uninterrupted schedule.

Thus, if positive suction discharge of the exhaust gases from the kiln 1 were practiced, either the fuel consumption rate would have to be increased or the limestone throughput rate would have to be decreased, either of which would increase the fuel consumption per unit limestone throughput per such 24 hour a day schedule.

Even so, that expedient would still not overcome the earlier discussed sponge effect of the calcium oxide as first formed on the limestone lumps for retaining carbon dioxide, considering that the known operation is carried out at normal atmospheric pressure.

Combining any of these expedients with the recycling of part or all of the spent combustion gases recovered with the carbon dioxide liberated from the limestone, by way of an exhaust recycling system, would merely intensify the build up of carbon dioxide in the kiln, and its partial pressure would undesirably cause a disturbance in the dissociation equilibrium specifically detrimental to the desired shaft to the right side of the equilibrium equation I, as above explained.

On the other hand, resort to batchwise vacuum calcination of the entirety of the limestone in a closed chamber and out of contact with any combustion gases suffers from the serious inefficiency and prohibitive cost drawbacks earlier discussed.

In contrast thereto, by way of the present invention, the normal calcining of the limestone in the kiln 1, i.e., at about ambient or normal atmospheric pressure, is instead carried out for a duration sufficient for at most only partially calcining the calcium carbonate content to calcium oxide and carbon dioxide, such that the hot mass of partially calcined limestone is recovered at the calcining temperature, e.g., at least about 1700° F. (927° C.) and preferably between about 1800°–2000° F. (982°–1093° C.), from the discharge outlet 3 at a point at which only for instance at least about 50% or 60%, or preferably more than about 60%, e.g., 75%, partial (and thus intentionally incomplete) conversion has been achieved.

As shown in FIG. 2, the partially calcined hot mass of limestone is, e.g., intermittently or batchwise, immediately conducted from the discharge outlet 3 of the kiln 1 to the adjacent separate and discrete closable, and desirably refractory lined, calcining vacuum chamber zone or arrangement 11 having a closable entrance 12 and a closable exit 13 as well as an appropriately located vacuum applying pipe 14 connected to a vacuum source (not shown), plus an entrance closure 15 and an exit closure 16 (both shown in phantom).

When the batch of the partially calcined hot mass of limestone has been filled into the vacuum chamber arrangement 11, the previously open entrance closure 15 is closed, the exit closure 16 having been closed throughout.

Then, a vacuum is applied locally via the vacuum applying pipe 14 to evacuate the vacuum chamber arrangement 11, whereupon the partially calcined hot mass of limestone, still at the calcining temperature at which the partial calcining was conducted in the kiln 1, continues to calcine solely by reason of the sensible heat remaining in the hot mass at such calcining temperature.

The continued calcining is positively aided by the locally applied vacuum which immediately and continuously removes the further generated or liberated attendant or resultant carbon dioxide from the vicinity of the hot mass.

The carbon dioxide in the vacuum exhaust flow in the vacuum applying pipe 14 may be recovered if desired (by means not shown) for any pertinent use, or merely vented to the atmosphere or otherwise disposed of. This expedient as well as the vacuum source itself are conventional items, as the artisan will appreciate.

Because the locally applied vacuum immediately and continuously removes or more precisely scavenges the attendant carbon dioxide as it is generated or liberated during the continued calcining in the vacuum chamber arrangement 11, the partial pressure of the carbon dioxide in the vicinity of the hot mass of the already partially calcined limestone is kept at a minimum, and cetainly below its equilibrium pressure at the corresponding temperature of such hot mass.

Hence, even though the hot mass progressively decreases in temperature as its retained sensible heat content is expended in independently achieving further calcination of the remaining calcium carbonate content in the mass, this is still sufficient under the applied vacuum to drive the dissociation reaction to the right side in accordance with the equilibrium equation I, all without the need for supplying further extraneous heat energy to the hot mass in the vacuum chamber arrangement 11, as in the case of the initial or partial calcining as carried out in the kiln 1.

Thus, under the applied vacuum or negative pressure condition existing in the vacuum chamber arrangement 11, the partial pressure of the carbon dioxide will necessarily be below atmospheric pressure, i.e., below 1 atmosphere absolute or below 760 mmHg, since the carbon dioxide is continuously being removedd and cannot build up therein.

As is clear from 1 and the group of FIG. 1, the equilibrium partial pressure will not be reached under such vacuum or negative pressure condition, even though the temperature of the hot mass of limestone may decline below roughly 1648° F. (898° C.). Moreover, as the temperature increasingly declines therebelow the dissociation reaction will continue to shift to the right side of the equilibrium equation I until the calcination is substantially completed, unless the partial pressure of the carbon dioxide earlier reaches the equilibrium point at such lower temperatures.

Of course, that equilibrium point will never be reached according to the present invention, since the degree or level of vacuum or negative pressure condition can be preselected or continuously or intermittently adjusted downwardly to keep the partial pressure of the carbon dioxide adequately and continuously below such equilibrium point.

Thus, as shown in FIG. 1 by extrapolation, taken with the data in Table 1, for instance, if the hot mass in the vacuum chamber arrangement 11 declines in temperature to 1562° F. (850° C.), the vacuum or negative pressure condition need merely be adjusted or kept below roughly about 370 mmHg, and if it further declines to 1472° F. (800° C.) such condition need merely be adjusted or kept below about 183 mmHg, etc.

Accordingly, any desired lower temperature down to about 898°–900° C. (1648°–1652° F.) may be used for the partial calcining in the kiln 1, since this will be counterbalanced by applying a concordantly stronger vacuum in the vacuum chamber arrangment 11, per the relationship shown in Table 1 and FIG. 1.

On the other hand, at such lower or declined temperature, the hot mass will still possess sufficient retained sensible heat corresponding to such temperature to achieve the desired further calcining of the concordantly lower or declined remainder of the uncalcined content of the hot mass until the fall content of the calcium carbonate present, and which is continuously so declining, has been reacted or dissociated substantially completely into calcium oxide and carbon dioxide.

It will be realized that because of the use of a vaccum location applied directly to the hot mass in the vacuum chamber arrangement 11, such will inherently overcome any earlier discussed sponge effect of calcium oxide as first formed on the limestone lumps for retaining carbon dioxide under normal atmospheric pressure conditions. Instead, efficient removal of the generated or liberated carbon dioxide will perforce occur under the local vacuum conditions contemplated in the second step or zone, in a manner consistent with the results shown in Tables 2, 2A and 2B.

Of course, the temperature of the hot mass of partially calcined limestone in the vacuum chamber arrangement 11, and the partial pressure of the carbon dioxide and/or the degree of vacuum or negative pressure therein, may be correspondingly sensed or determined and controlled on a continuous or automatic basis by providing the vacuum chamber arrangement 11 with conventional temperature and pressure sensing or indicating devices such as heat or temperature probes or thermometers and vacuum or pressure probes or recorders, or the like (not shown), for conventional control purposes, as the artisan will appreciate.

After substantially complete calcination of the limestone has been achieved in the vacuum chamber arrangement 11, the contents thereof may be withdrawn, upon terminating the vacuum, by opening the closure 16 of the exit 13.

Preferably, the still hot substantially completely calcined and essentially carbon dioxide free mass, now constituting the desired lime or quicklime or calcium oxide product, upon being withdrawn via the exit 13 from the vacuum chamber arrangement 11, is immediately fed to a cooler device 17 for further cooling, e.g., by contact with the air to be used for the combustion of the fuel in the kiln 1, and thereby preheating such air, after which the lime is recovered from the cooler device 17.

Such immediate further cooling is desirable to inhibit any tendency for reversing the dissociation reaction according to the equilibrium equation I, should the calcium oxide or lime product again come into contact with a significant concentration of carbon dioxide, since this would objectionably reform calcium carbonate.

In order to conserve the heat energy in the hot mass of limestone which leaves the discharge outlet 3 of the refractory lined kiln 1 and enters the entrance 12 of the refractory lined vacuum chamber arrangement 11, as well as the heat energy in the hot mass during its stay in such vacuum chamber arrangement 11, a heat retaining hood 18, e.g., of or lined with thermal insulation or refractory material, is advantageously provided.

The hood 18 operatively encloses the discharge end of the kiln 1 as well as the entirety of the separate vacuum chamber arrangement 11 adjacent thereto, so as to minimize heat loss from the hot mass in the vicinity of the kiln discharge outlet 3 and in the vacuum chamber arrangement 11 itself, and thereby further conserve energy from this potential source of heat loss as well.

Since the cooler device 17 is intended to achieve transfer of heat from the still hot mass calcium oxide product leaving the exit 13 of the vacuum chamber arrangement 11, it is understandably conveniently disposed externally of the hood 18.

Nevertheless, it will be appreciated from FIG. 2, that the apparatus of the present invention lends itself to modification or retrofit of existing lime kiln installations, since the vacuum chamber arrangement 11 and hood 18 may be merely added to the discharge end of an existing lime kiln 1. In turn, the cooler device 17 may be optionally arranged in flow communication with the hood 18 in the vicinity of the exit 13 of the vacuum chamber arrangement 11 for receiving the substantially completely calcined hot mass therefrom for further or final cooling.

In accordance therewith, the kiln 1 will then be operated so as to achieve only partial calcining of the limestone therein, whereupon the remainder of the calcining will be achieved in the vacuum chamber arrangement 11, as above described.

Of course, after a given batch of the partially calcined limestone has been subjected to completion of the calcining under vacuum in the vacuum chamber arrangement 11 and then withdrawn from the exit 13, upon opening the entrance and exit closures 15 and 16, the exit closure 16 will be reclosed while the entrance closure 15 will remain open to receive a further successive batch of the partially calcined limestone from the discharge outlet 3 of the kiln 1, and the above described cycle will be repeated.

In actuality, since the first step or stage partial calcining of the limestone in the kiln 1 is normally carried out as a continuous process, whereas the second step or stage vacuum applied remaining calcining of the limestone in the vacuum chamber arrangement 11 is normally carried out as a batch process, as above described, the vacuum chamber arrangement 11 normally contemplates in turn at least two separate and refractory lined vacuum chambers or vacuum subzones (not shown), such that the hot mass from the discharge outlet 3 of the kiln 1 is immediately fed in a corresponding batch amount and without delay alternately to a corresponding such subzone.

Thus, while a given batch is undergoing vacuum applied completion of the calcining of the hot mass of limestone in one such vacuum chamber or subzone, the continuous flow from the discharge outlet 3 of the kiln 1 of the hot mass is diverted to the next or alternate such vacuum chamber or subzone to dispense its batch thereto.

Depending on the flow rate of the hot mass recovered from the discharge outlet 3 of the kiln 1 (which is directly dependent upon the feed rate of limestone to the kiln 1) and the temperature and degree of partial calcining of the hot mass at that point, on the one hand, and the size of the respective vacuum chamber or subzone and the degree or level of vacuum or negative pressure applied thereto, on the other hand, the overall operation of the system may be accommodated by only two such vacuum chambers or subzones, or by more than two, as the case may be.

In short, the number of such vacuum chambers or subzones needed may be determined by the selective hot mass flow rate or throughput in the kiln 1, the selective temperature of such hot mass as well as the selective degree of partial calcining of such hot mass, as separate first step or stage factors in conjunction with each other, plus the selective size of, and selective degree or level of vacuum or negative pressure applied to, the corresponding vacuum chambers or subzones, as separate second step or stage factors in conjunction with each other, and in conjunction with the first step or stage factors.

Nevertheless, the above three first step or stage factors will themselves be influenced somewhat by the earlier considerations discussed regarding the relative rates of flow through the kiln 1 of the heating fuel and combustion air and their gaseous combustion products, although these latter flow rates may be selected for maximum efficiency as to complete burning of the fuel within the kiln 1 and as to the longest possible residence time of the gaseous combustion products in contact with the limestone for imparting their sensible heat values to the limestone consistent with the maintaining of the partial pressure of the carbon dioxide in the kiln 1 below the equilibrium point as indicated in Table 1 and FIG. 1 relative to the equilibrium equation I, and with less regard for efficiency as it relates to completing the calcining of the limestone in the kiln 1.

This is because, unlike the conventional calcining operation in kiln 1, according to the present invention the limestone is intentionally only selectively partially calcined therein, with the remainder of the calcining being intentionally completed under an entirely different set of selective conditions in the vacuum chamber arrangement 11, and more specifically in batchwise manner in the alternate vacuum chambers or subzones.

Hence, according to the present invention, on the one hand, fuel combustion efficiency can be maximized in the first step to achieve complete burning of the fuel, regardless of its type, and in turn the flow rate of the combustion gases can be adjusted for optimum residence time in the lime kiln 1, independently of the flow rate or throughput of the limestone in the kiln, and on the other hand completion of the calcining can be maximized in the second step by selecting a degree or level of vacuum in the vacuum chamber arrangement 11, which is sufficiently below the carbon dioxide equilibrium pressure corresponding to the temperature of the hot mass therein at any point in time, and conjointly a residence time, which is directly dependent on the percentage of partial calcining carried out in the first step.

The versatility of the system of the present invention may be specifically appreciated from FIGS. 3 and 4, especially regarding the adaptability thereof to modification or retrofit of existing systems.

FIG. 3 shows an existing vertical shaft lime kiln installation, and FIG. 4 shows an existing horizontal rotary lime kiln installation, each of which is modified by including a corresponding vacuum chamber arrangement, cooler device and hood, of the same type as shown in FIG. 2. Hence, the same reference numerals have been used in each of FIGS. 2-4 to designate like parts.

As to FIG. 3, the limestone is fed to the top feed inlet $2a$ of the refractory lined shaft kiln $1a$ and the intentionally only partially calcined hot mass of limestone is recovered from the bottom discharge outlet $3a$. Fuel is fed via the fuel line or lines $4a$ and combustion air is introduced via air supply line $5a$ and/or through the bottom discharge outlet $3a$. The gaseous combustion products and generated or liberated carbon dioxide are exhausted via the exhaust gases line $6a$ and/or through the top feed inlet $2a$. The hood $18a$ operatively encloses the bottom end of the shaft kiln $1a$. The remaining parts 11 to 17 are the same as those of FIG. 2.

As to FIG. 4, the limestone is fed to the upper feed inlet $2b$ of the slightly inclined (e.g. 3 to 5 degrees) refractory lined horizontal rotary kiln $1b$ and the intentionally only partially calcined hot mass of limestone is recovered from the lower discharge outlet $3b$. Fuel is fed via a fuel line or burner $4b$ at the discharge outlet $3b$, along with combustion air via air supply line $5b$, for release into the downstream portion of the kiln near the open discharge end for combustion and/or heating flow therealong, in the conventional manner. The gaseous combustion products and generated or liberated carbon dioxide are exhausted via the preheater shroud exhaust gases line $6b$ at the feed inlet $2b$ and which operatively encloses the inlet end of the rotary kiln $1b$ in relative rotational sealing relation therewith in the well-known manner. The hood $18b$ correspondingly operatively encloses the discharge end of the rotary kiln $1b$ analogously in such relative rotational sealing relation therewith in the conventional manner. The remaining parts 11 to 17 are the same as those of FIG. 2.

The flow of the limestone in both the shaft kiln $1a$ of FIG. 3 and the rotary kiln $1b$ of FIG. 4 is countercurrent to the flow of the gaseous combustion products and generated or liberated carbon dioxide, in the same general manner as discussed in connection with the system of FIG. 2.

As earlier noted, the shaft kiln $1a$ of FIG. 3 is usually employed for calcining relatively larger size limestone lumps, and the rotary kiln $1b$ of FIG. 4 is usually employed for calcining relatively smaller size limestone lumps, but in either case the partially calcined hot mass is readily accommodated in the vacuum chamber arrangement 11 for completing the calcining therein in accordance with the present invention.

Clearly, each of the kiln installations of FIGS. 3 and 4 may be easily modified or retrofit to provide the system of the present invention by adding the corresponding refractory lined vacuum chamber arrangement and hood thereto, with the hood $18b$ in the case of FIG. 4 being arranged, of course, to accommodate the fuel line or burner $4b$ and the air supply line $5b$ therein.

FIGS. 5 and 6, which are not necessarily drawn to scale, show a preferred form of a rotary kiln installation arrangement according to the present invention, in which the refractory lined rotary kiln $1c$ is of generally the same type as rotary kiln $1b$ of FIG. 4, and of which only the pertinent discharge end containing the discharge outlet $3c$ is shown, plus the fuel line or burner $4c$ and the air supply line $5c$ thereat (FIG. 5).

Here, the vacuum chamber arrangement includes a pair of side by side or laterally opposed upright refractory lined vacuum chambers or subzones 11c and 11d, arranged below the discharge outlet 3c, and correspondingly having the closable upper entrances 12c and 12d, the closable lower exits 13c and 13d, and the appropriately located vacuum applying pipes 14c and 14d connected to a common vacuum source or separate vacuum sources (not shown), as desired.

The entrances 12c and 12d are provided with the corresponding entrance closures 15c and 15d and the exits 13c and 13d are provided with the corresponding exit closures 16c and 16d.

The hood 18c suitably operatively encloses the above parts in the same way as in the installation of FIG. 4.

As specifically shown, a diverter arrangement, including a guide 19 mounted on the hood 18c and a swivel plate 20 pivoted to the guide 19, is arranged at the discharge outlet 3c of the kiln 1c in the manner of a distributing gate for alternately directing the hot mass continuously recovered from the discharge outlet 3c to the corresponding entrances 12c and 12d of the vacuum chambers 11c and 11d therebelow, i.e. by simple gravity flow feed, when their respective entrance closures 15c and 15d are alternatively opened.

Also, a common chute 21 is mounted in the hood 18c at the exits 13c and 13d of the vacuum chambers 11c and 11d, for conveying by simple gravity flow the hot mass of completely calcined product from the alternately opened exits 13c and 13d of the vacuum chambers to the entrance 22 of the common rotary contact cooler device 17c.

The cooler device 17c is of conventional design and is arranged outside of the hood 18c but has its entrance 22 in flow communication with the hood 18c at the bottom of the chute 21. Cold air is taken in at the external exit 23 of the cooler device 17c and passes into direct cooling contact with the hot mass product passing outwardly along the cooler device 17c in the direction from its entrance 22 to its exit 23, i.e. in countercurrent direction to the incoming cold air.

Advantageously, the cooler device 17c contains a conventional rotary vane element 24 (FIG. 6) which rotates the hot mass product to enhance the heat exchange cooling thereof by the incoming cold air, such that the essentially carbon dioxide free cooled mass product is conveyed to and discharged from the exit 23 of the cooler device 17c for recovery.

On the other hand, the now heated cooling air may be recovered from the entrance 22 of the cooler device 17c and used as preheated combustion air in the kiln 1c in conventional manner by merely permitting such preheated air to rise within the confines of the hood 18c and enter the discharge outlet 3c of the kiln 1c.

Since such preheated air is not enriched by carbon dioxide, it does not disturb the balance of the carbon dioxide partial pressure upon being fed to the kiln 1c.

Significantly, in all cases, any air fed to the kiln should preferably be preheated, since it is to be used primarily for combustion and not for cooling the partially calcined lime, as understandably a basic aim of the present invention is to feed the latter to the vacuum chamber arrangement without diminishing its temperature or sensible heat content.

Preferably, a by pass flow directing pipe or conduit 25 is provided in the hood 18c between the vacuum chambers 11c and 11d and directly below the guide 19 so that, upon appropriate by pass positioning of the swivel plate 20, the hot mass recovered from the discharge outlet 3c of the kiln 1c may be fed directly to the conduit 25, thus by passing the vacuum chambers 11c and 11d and the chute 21, and in turn be directed from the conduit 25 to the bottom outlet 26 of the hood 18c for by pass recovery therefrom, e.g. in the case of an emergency, as where there is a malfunction in the operation of the vacuum chamber arrangement.

Of course, the operation and control of the various entrance and exit closures 15c and 15d, and 16c and 16d, and of the swivel plate 20, and of the applying and releasing of the vacuum in the vacuum pipes 14c and 14d, may be carried out in conventional manner, using well known manual or automatic means (not shown), as the artisan will appreciate.

In operation, as regards the installation of FIGS. 5 and 6, partially calcined lime, i.e. limestone in which part of the calcium carbonate has dissociated into calcium oxide and carbon dioxide so as to result in a hot mass of mixed $CaO/CaO_3$ in each stone granule or particle lump, and representing a composite average limestone conversion to lime or quicklime of only for instance at least about 50% or 60%, or preferably more than about 65%, e.g. 75% CaO/25% $CaCO_3$, which has been supplied with sensible heat, e.g. sufficiently to maintain its average temperature at about 1800° F. (982° C.) in the calciner or rotary lime kiln 1c, discharges at a steady flow rate from the open end discharge outlet 3c.

This discharged hot mass is transferred by the diverter gate or swivel plate 20, by simple gravity induced solids flow and immediately to avoid heat loss, downwardly directly to the first vacuum chamber 11c through its top entrance 12c, whose top closure 15c, arranged as a slide closure or sealing gate, is in open position, while the bottom closure 16c, arranged as a gravity flow discharge hinged trap door closure or sealing gate, at the bottom exit 13c, remains in closed position.

After the first vacuum chamber 11c is sufficiently filled with the hot partially calcined lime or quicklime, the diverter gate or swivel plate 20 is realigned so that the continuous flow from the lime kiln 1c is instead discharged directly into the second vacuum chamber 11d through its top entrance 12d, whose top closure 15d, also arranged as a slide closure or sealing gate, is earlier moved to open position, while the bottom closure 16d, also arranged as a gravity flow discharge hinged trap door closure or sealing gate, at its bottom exit 13d, remains in closed position.

At about the same time as the diverter gate or swivel plate 20 is realigned to direct the flow to the second vacuum chamber 11d, the top sealing gate or closure 15c is moved to closed position, and a vacuum is locally applied via the vacuum applying pipe 14c to the now closed and sealed first vacuum chamber 11c.

Calcination continues at a fast pace in the first vacuum chamber 11c because the retained sensible heat content in the partially calcined hot mass, in the presence of the applied vacuum for suppressing the partial pressure of the continuingly generated or liberated carbon dioxide by immediately and continuously removing or scavenging such carbon dioxide via the vacuum applying pipe 14c, is sufficient at the attendant temperature, e.g. of about 1800° F. (982° C.), to assure a high rate of calcium carbonate dissociation and conversion, as well as substantial completion of the calcination of the correspondingly reduced quantity hot mass remaining at that point within a reasonably short duration.

By the time the second vacuum chamber 11d is nearly filled, the partially calcined limestone in the first vacuum chamber 11c is substantially completely calcined to lime or quicklime. At this point, the vacuum in the first vacuum chamber 11c is released, the top and bottom sealing gates or closures 15c and 16c are correspondingly opened, and the substantially completely calcined hot mass of lime or quicklime product is allowed to discharge by simple gravity flow out from the bottom exit 13c, thence along the chute 21, and into the entrance 22 of the contact cooler device 17c in essentially gaseous carbon dioxide free condition.

After all of the now calcined lime or quicklime has emptied from the first vacuum chamber 11c, its bottom sealing gate or closure 16c is reclosed, the diverter gate or swivel plate 20 is again realigned to direct the continuous flow of the partially calcined hot mass from the discharge outlet 3c once more into the first vacuum chamber 11c, and the top sealing gate or closure 15d of the second vacuum chamber 11d is closed to allow a vacuum to be pulled in the second vacuum chamber 11d via its vacuum applying pipe 14d.

In this way, the cycle is repeated, so as to move the partially calcined limestone/lime hot mass being continuously discharged from the lime kiln 1c alternately to each of the vacuum chambers 11c and 11d in succession, while allowing for a vacuum time period in each corresponding closed chamber sufficient to complete substantially the calcination of the batch of hot mass therein, followed by cooling of the resultant essentially gaseous carbon dioxide free lime or quicklime product, alternately discharged in succession from such vacuum chambers, in the common contact cooler device 17c for correspondingly continuous discharge of the cooled product from the latter at the same flow rate as that of the hot mass being continuously discharge from the kiln 1c.

On the other hand, in the case of an upset in the system, whereby the hot mass being continuously discharged from the kiln 1c must be diverted from the vacuum chambers 11c and 11d, the diverter gate or swivel plate 20 can be set so that the hot mass from the discharge outlet 3c of the kiln 1c bypasses the vacuum chambers 11c and 11d as well as the common chute 21 and the cooler device 17c, and instead flows downwardly by simple gravity flow directly into and through the overflow pipe or conduit 25 to the bottom of the firing chamber or hood 17c and out the bottom outlet 26 thereat for disposal.

It will be appreciated that the fully calcined and essentially carbon dioxide free lime or limestone product, upon leaving each of the corresponding vacuum chambers 11c and 11d may be cooled by any suitable deheater or cooling apparatus, such as the conventional planetary rotary cooler device 17c or any other heat exchanger device.

By employing cold air as the cooling fluid or cooling gas for direct flushing contact cooling of the hot mass product, the resultant hot gases discharged from the cooler device may be returned via the entrance 22 of the cooler device 17c to the firing hood chamber area within the hood 17c to maintain or supplement the heat or heat condition around the vacuum chambers 11c and 11d.

Any remaining or residual heat in such gases may be ultimately returned to the firing chamber of the kiln 1c by direct entry through the discharge outlet 3c for total recovery or reuse of the heat values in such gases, as earlier discussed, all without air cooling of the partially calcined mass discharging from the kiln.

The significance of the use of the retained sensible heat in the partially calcined limestone, recovered from the first step or stage partial calcining in the first zone or lime kiln, for independently completing the substantial calcination of the remaining unconverted calcium carbonate in the correspondingly reduced quantity hot mass fed to the second step or stage in the second zone or vacuum chamber arrangement, under an applied vacuum or negative pressure in the latter and without the need for supplying additional extraneous heat energy thereto, may be appreciated in terms of an inherent optional modification of the arrangement shown in FIGS. 5 and 6, whereby to provide for a continuous rather than a batchwise vacuum treatment in the second step or stage in the second zone or vacuum chamber arrangement.

Per such inherent modification, only the vacuum chamber 11c is used (cf. the arrangement 11 of FIG. 2, the arrangement 11a of FIG. 3, and the arrangement 11b of FIG. 4), such that its top entrance and top closure, corresponding to entrance 12c and closure 15c, are in the form of a conventional hopper entrance containing a top rotary metering valve closure (not shown) and its bottom exit and bottom closure, corresponding to exit 13c and closure 16c, are likewise in the form of a conventional hopper exit containing a bottom rotary metering valve closure (not shown) whereby to permit its vacuum applying pipe, corresponding to vacuum applying pipe 14c, to exert a vacuum locally continuously on the interior of the vacuum chamber in uninterrupted fashion, since the two rotary valves operating synchronously will meter the gravity flow hot mass, in turn from the discharge outlet of the corresponding lime kiln continuously into the adjacent separate and discrete vacuum chamber, via the hopper entrance containing top rotary valve, and thence continuously from the vacuum chamber, via the bottom rotary valve, for post cooling, e.g. in the cooler device 17c, all without permitting significant air leakage into the vacuum chamber via the rotary valves due to their conventional continuous sealing relation with the corresponding confines of the hopper entrance and hopper exit in which they are operatively located.

Any minor quantity of air incrementally introduced via the rotary valve pockets or sectors themselves will of course be immediately removed from the vacuum chamber by the locally applied vacuum.

This inherent modification lends itself to application to the installations shown in all embodiments, i.e. including those of FIGS. 2, 3, and 4, as well as that of FIGS. 5 and 6, with the continuous gravity flow of the hot mass in the vacuum chamber from the top rotary valve to the bottom rotary valve being effected in analogous manner to the gravity flow of the limestone from the top feed inlet 2a to the bottom discharge outlet 3a of the vertical shaft lime kiln 1a of FIG. 3.

Naturally, as to the inherent modification system using a single vacuum chamber in continuous manner, it will be appreciated, i.e. in accordance with the earlier discussion of the various factors or parameters regarding the flow rates of the gaseous and solids components of the system, that the size and in particular the flow cross section and vertical length of the lime kiln and the single vacuum chamber, as well as the metering capacity and speed of rotation of the top and bottom rotary valves of the vacuum chamber, must be matched or coordinated, relative to a given flow of fuel and combustion gas into the lime kiln and consequent gaseous combustion products and generated or liberated carbon dioxide exhausted therefrom, and conjoint flow of limestone feed through the lime kiln, in order for the residence time of the hot mass in the vacuum chamber to be sufficient to complete the calcining of the hot mass before it is discharged from the vacuum chamber via the bottom rotary valve, at a correspondingly given calcining temperature of the hot mass leaving the kiln discharge outlet and entering the vacuum chamber via the top rotary valve, for its retained sensible heat content to complete the calcining of the remaining uncalcined calcium carbonate content, under the conjointly given degree or level of vacuum or negative pressure continuously applied locally to the hot mass in the vacuum chamber via the vacuum applying pipe thereof.

Of course, the same general considerations as to matching or coordinating the various factors of parameters, etc. apply analogously to the system of using two or more separate vacuum chambers alternately in batchwise manner, as shown in the installation of FIGS. 5 and 6.

These various considerations illustrate the fact that the noted factors or parameters may be independently or conjointly selected to maximize the overall efficiency of the operation for conserving heat energy at a given throughput rate of limestone feed through the system, whether conducted in batchwise manner or in continuous manner as regards the vacuum chamber zone or second step or stage, so long as the retained sensible heat in the hot mass leaving the kiln zone or first step or stage, regardless of its particular temperature and/or degree of partial calcining, is sufficient to complete such calcining of the hot mass in the vacuum chamber zone or second step or stage, i.e. within a practical industrial scale residence time or duration in the latter, and so long as the degree or level of the applied vacuum or negative pressure in the vacuum chamber zone or second step or stage is sufficient to remove attendant generated or liberated carbon dioxide from the vicinity of the hot mass undergoing completion of the remainder of the calcining for more or less continuously maintaining the partial pressure of the carbon dioxide below the equilibrium pressure at the corresponding temperature of the hot mass at any given point during its stay in the vacuum chamber zone or second step or stage, i.e. according to Table 1 and FIG. 1.

Although the individual granules or particles, constituting the starting lumps of stone or rock form limestone, generally retain the original lump structure, during and consequent the calcining, as the carbon dioxide dissociates from the original solid calcium carbonate (limestone) and the latter changes increasingly, e.g. radially inwardly throughout its volume or lattice, into the new solid calcium oxide (lime or quicklime), to provide increasingly porous or less dense lumps, and although the increasingly calcined hot mass of such lumps contains open spaces or voids between the individual lumps, such that during the completion of the calcining in the second step or stage in the vacuum chamber zone the locally applied vacuum is able to reach the interior volume portions of the hot mass for efficient continuous removal of the generated or liberated carbon dioxide from the site or vicinity of the hot mass, further inherent optional provision may be made to enhance the access of the vacuum to such interior volume portions, or more particularly to minimize the distance between the exterior of the aggregate mass and its most remote interior portion in one geometric direction.

Specifically, the vacuum chamber used may be sized and shaped to provide a relatively large area and small geometric thickness internal volume for containing the hot mass in comparable conforming disposition, e.g. by providing the chamber with a relatively long vertical dimension and a relatively long horizontal dimension but with a relatively short transverse thickness dimension, whereby the applied vacuum will be able to reach easily the interior volume portions of the aggregate hot mass from each side of such short transverse thickness dimension.

Whereas the system of the present invention is particularly applicable to a horizontal rotary kiln installation, which normally uses relatively smaller lumps, e.g. below an average diameter size of about 4 inches, as the limestone feed, such that the partial calcining in the first step rotary kiln may be completed at a correspondingly short residence time or duration, and the completion of the calcining under vacuum in the second step vacuum chamber arrangement may be completed at a likewise correspondingly short residence time or duration, since the smaller lumps are generally more easily and rapidly subjected to the heating effect in the first step and to the vacuum effect in the second step, nevertheless the system of the present invention is also applicable just as well to a vertical shaft kiln installation.

Even though a vertical shaft kiln installation normally employs relatively larger lumps, e.g. of an average diameter size of between about 4 to 8 inches, as the limestone feed, such that the partial calcining in the first step shaft kiln may require a correspondingly longer residence time or duration and/or a higher calcining temperature, and thus more heat energy, and the completion of the calcining under vacuum in the second step vacuum chamber arrangement may require a likewise correspondingly longer residence time or duration and/or a higher degree or level of applied vacuum, and thus more use of vacuum, as compared to a horizontal rotary kiln installation, nevertheless because of the versatility of the present invention, as regards the independent or conjoint selection of the various factors or parameters as earlier discussed, the system can be adjusted for maximum efficiency of operation, especially as regards the conserving of heat energy or fuel consumption, since only incomplete calcination is intentionally achieved in the lime kiln.

Because the vacuum chamber may be selectively modified as to its size and shape to minimize the distance between the most remote interior portions of the hot mass and the nearest edge or exterior side of such mass, by appropriate selection of the size and shape determining dimensions of such vacuum chamber, as above pointed out, the larger size lumps normally processed in a vertical shaft kiln installation can be readily accommodated in such a selectively sized and shaped vacuum chamber at minimum usage of applied vacuum under the circumstances, whether the second step or stage is carried out in batchwise manner or in continuous manner.

Moreover, since the vacuum calcining step is carried out without supplying extraneous heat to the hot mass, mixed size or wider graduation range lumps may be employed versatilely in the system of the present invention, because the smaller size lumps will not overburn in the lime kiln in view of the shorter residence time and lower calcining temperatures usable therein, whereas the partially calcined larger size lumps will be substantially completely calcined in the vacuum chamber at temperatures no greater than those in the lime kiln and thus also insufficient to overburn such small size lumps in the vacuum chamber.

In line with the foregoing, it will be appreciated that the present invention may be readily adapted to and carried out in other types of kiln installations such as double shaft kilns including those of the Austrian parallel flow vertical kiln or Schmid-Hofer or Maerz or PRF type (hereinafter collectively Maerz double shaft kiln).

This Maerz type double shaft kiln normally operates under a positive pressure during part of its alternating cycles of operation, but as is clear from the foregoing, can be readily modified to operate as a first stage positive heat energy applied calcining kiln and alternately as a second stage vacuum calcining kiln, according to the basic concept of the present invention.

The Maerz or parallel flow type kilns are generally discussed in the treatise Chemistry and Technology of Lime and Limestone, Robert S. Boynton, 2nd Ed. 1980, pages 232 and 247 to 249.

Thus, as regards one of the two shaft kilns constituting the Maerz parallel flow or double shaft kiln installation, it may be operated in the normal heat supplied manner for first stage partial calcining of its limestone charge according to the present invention, and thereafter upon sealing such kiln and applying a vacuum thereto, it may be operated for second stage vacuum calcining according to the present invention.

Conjointly, while the first of such two shaft kilns is being operated for such second stage vacuum calcining, the second of such two shaft kilns may be operated in the normal heat supplied manner for first stage partial calcining of its corresponding limestone charge according to the present invention; and thereafter upon sealing such second kiln and applying a vacuum thereto, it may be operated for second stage vacuum calcining according to the present invention, while in turn the first such kiln is again being operated for first stage partial calcining of a fresh charge; all in alternating cycle concordant manner, with both the first and second steps in each case being carried out successively in the same shaft kiln.

Alternatively, a separate vacuum chamber arrangement and heat retaining hood may be provided at the discharge end of each of the two shaft kilns of the Maerz parallel flow or double shaft kiln installation, such that the two shaft kilns are individually operated in the normal manner but only for first stage partial calcining of the respective limestone charge in each according to the present invention, whereupon the corresponding partially calcined charge is then discharged under the attendant hood into the associated adjacent separate vacuum chamber arrangement for second stage vacuum calcining therein according to the present invention; similarly all in alternating cycle concordant manner via two corresponding installations analogous to the installations shown in FIGS. 2 and 3, for either batch or continuous operation in the manner earlier discussed.

It will be clear from the foregoing that the following advantages in particular are attained by carrying out the calcining of limestone in a successive two step or stage or zone manner according to the system of the present invention:

1. heat energy conservation, e.g. of at least about 25% of the heat energy otherwise needed, 2. lower lime kiln temperatures than otherwise needed, 3. less expensive refractory linings may be used in the lime kiln consonant with the lower temperatures at which the lime kiln may be operated, 4. softer lime, i.e. of greater porosity and higher surface area, than otherwise will be produced due to the permitted use of lower calcining temperatures for only incompletely calcining the limestone in the lime kiln, and 5. the system is such that it can be retrofit to most existing lime kiln installations.

All of the foregoing considerations emphasize the fact that, other things being equal, the system of the present invention may be operated within wide range limits as to the lump size of the limestone feed, the calcining temperature in the lime kiln consistent with normal atmospheric conditions, the degree of incomplete or partial calcining in the lime kiln, the duration of the limestone in the lime kiln, the degree or level of vacuum applied in the vacuum chamber arrangement, and the duration of the partially calcined limestone in the vacuum chamber arrangement, using either a shaft kiln or a rotary kiln, or other type kiln installation, as discussed above, as may be appropriate and either alternately in succession at least two separate vacuum chambers or subzones in batchwise manner or inherently optionally a single vacuum chamber or zone in continuous manner, so long as the retained sensible heat in the partially calcined limestone in the vacuum chamber arrangement is sufficient to complete the calcining of the limestone, and so long as the applied vacuum is sufficient to maintain the partial pressure of attendant carbon dioxide in the vacuum chamber arrangement below the equilibrium pressure at the corresponding temperature of the hot mass in the vacuum chamber arrangement at any given time, in accordance with the equilibrium equation I, Table 1 and FIG. 1.

Hence, the partial calcining of the limestone in the lime kiln may be only at least about 50 or 60 or 65%, or about two thirds complete, and particularly about 50–85, or 65–85, or 70–80, or 72–78%, complete, e.g. about 75% or three-quarters complete, such that the heat energy or fuel consumption conserved will correspondingly be about 50 or 40 or 35%, or about one-third, and particularly about 50–15, or 35–15, or 30–20, or 28–22,% of that otherwise normally used, e.g. a 25% saving where the calcining is only 75% complete.

Consonant therewith, the calcining temperature in the lime kiln may be only at least about 1700° F. (927° C.), or about 1700°–2700° F. (927°–1482° C.), and particularly about 1700°–2100° F. (927°–1149° C.), or more particularly 1800°–2000° F. (982°–1093° C.), and especially 1800°–1850° F. (982°–1010° C.).

On the other hand, since the degree or level of the applied vacuum in the vacuum chamber arrangement will be directly related to the corresponding temperature of the hot mass of partially calcined limestone in the vacuum chamber arrangement at any given time, it need only be sufficient to reduce the partial pressure of the attendant carbon dioxide to a level effectively below the equilibrium pressure thereof relative to the remaining calcium carbonate present in accordance with the equilibrium equation I, Table 1 and FIG. 1, at that corresponding temperature.

Figure 7:
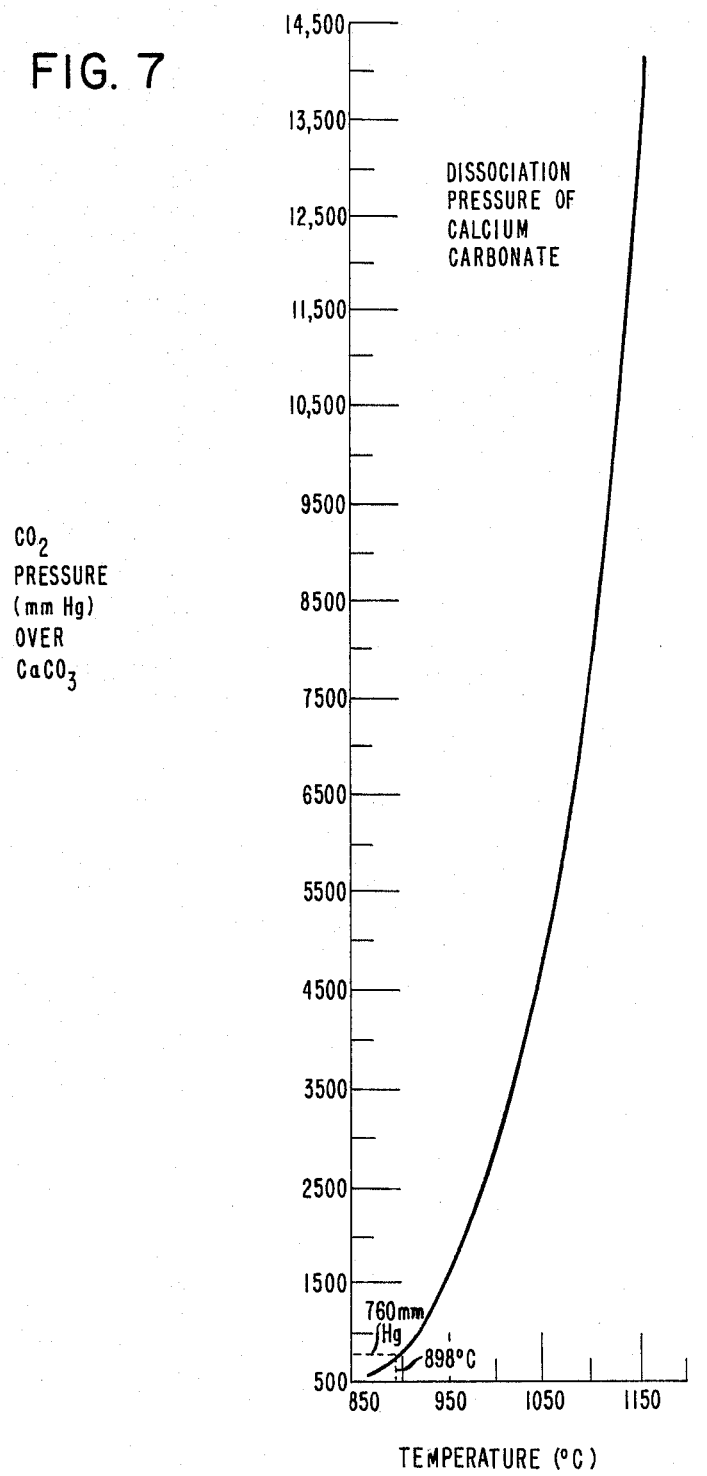
FIG. 7 is a schematic view of a graph showing a portion of the range of, yet having the same values as, the graph of FIG. 1.

The relationship involved may be more clearly appreciated from the graph of FIG. 7, which represents that portion of the graph of FIG. 1 in the pressure range between 500 and 14,500 mm Hg and the temperature range between 850° C. (1562° F.) and 1200° C. (2192° F.), and which is likewise based on the data in Table 1. Whereas the graph of FIG. 1 is at the ratio of 1000 mm Hg per 50° C., that of FIG. 7 is at the ratio of 500 mm Hg per 50° C., for clarity of presentation.

Thus, by way of extrapolation from the graph of FIG. 7, it is seen that the equilibrium pressure of carbon dioxide at 1700° F. (927° C.) is roughly about 1000 mm Hg, at 1800° F. (982° C.) is roughly about 2250 mm Hg, at 1850° F. (1010° C.) is roughly about 2750 mm Hg, at 2000° F. (1093° C.) is roughly about 7000 mm Hg, and at 2100° F. (1149° C.) is roughly about 13,000 mm Hg.

Although this means that if the hot mass from the first step in the kiln is fed to the second step in the vacuum chamber at a temperature of 1700°-2100° F. (927°-1149° C.), the calcining will continue even though no vacuum is applied, i.e. so long as the carbon dioxide level therein remains below the corresponding equilibrium pressure of roughly about 1000-13,000 mm Hg, as aforesaid, unless suitable provision were made for such carbon dioxide removal, the vacuum chamber would soon fill with carbon dioxide gas and the equilibrium pressure would soon be reached to prevent further calcining and in turn permit recarbonation, and at the same time, the hot mass would continue to cool and needlessly lose its retained sensible heat content, even with the provision of heat loss minimizing refractory linings for the vacuum chamber arrangement and hood.

Hence, a vacuum condition will be maintained in the second step according to the present invention not only to enhance the shift of the equilibrium equation to the right side for further calcining (and obviously to prevent recarbonation as well) but to do so for practical efficiency industrial scale throughput quantities per unit residence time in the second step.

This is because under normal heat dissipation conditions, and despite the fact that the vacuum chamber arrangement is refractory lined and the hood is provided as a heat retaining hood of or lined with insulating or refractory material, heat transfer or heat loss from the hot mass will normally always take place at some constant rate with time, whether the calcining dissociation reaction continues or not.

Also, for each mole of $CaCO_3$ calcined, 43,000 calories are used, which in effect likewise cools the lime mass. Therefore, continuous vacuum application is necessary to keep the carbon dioxide partial pressure below the calcining level as shown by FIG. 7.

Advantageously, according to the present invention, within such time the vacuum will accelerate carbon dioxide removal and correspondingly the rate of the further calcining, as compared to the constant rate of heat transfer or heat loss which normally takes place anyway, so as to complete the calcining at efficient residence time rates in the second step and thus at efficient levels of vacuum consumption, or more specifically at efficient levels of consumption of vacuum generating energy, even though the hot mass may be at a temperature of at least about 1700° F. (927° C.), and for instance up to about 2400° F. (1316° C.) or 2100° F. (1149° C.), or any preferred range therebetween, as desired, and thus theoretically not require a vacuum condition for the further calcining of the still hot mass to proceed or continue at that point.

On the other hand, where a particularly strong vacuum is used in the second step vacuum applied calcining, the temperature used in the first step heat supplied calcining may be even lower than about 1700° F. (927° C.), i.e., down to 1648°-1652° F. (898°-900° C.), in general concordance with the approximate values indicated in FIGS. 1 and 7, as based upon the data in Table 1, since the hot mass fed to the second step vacuum chamber at that lower temperature is still capable of undergoing the remaining calcining during its inherent continued cooling, so long as the vacuum applied locally to the hot mass in the second step is below the carbon dioxide equilibrium pressure and sufficient to shift the equilibrium equation I to the right side.

Figure 8:
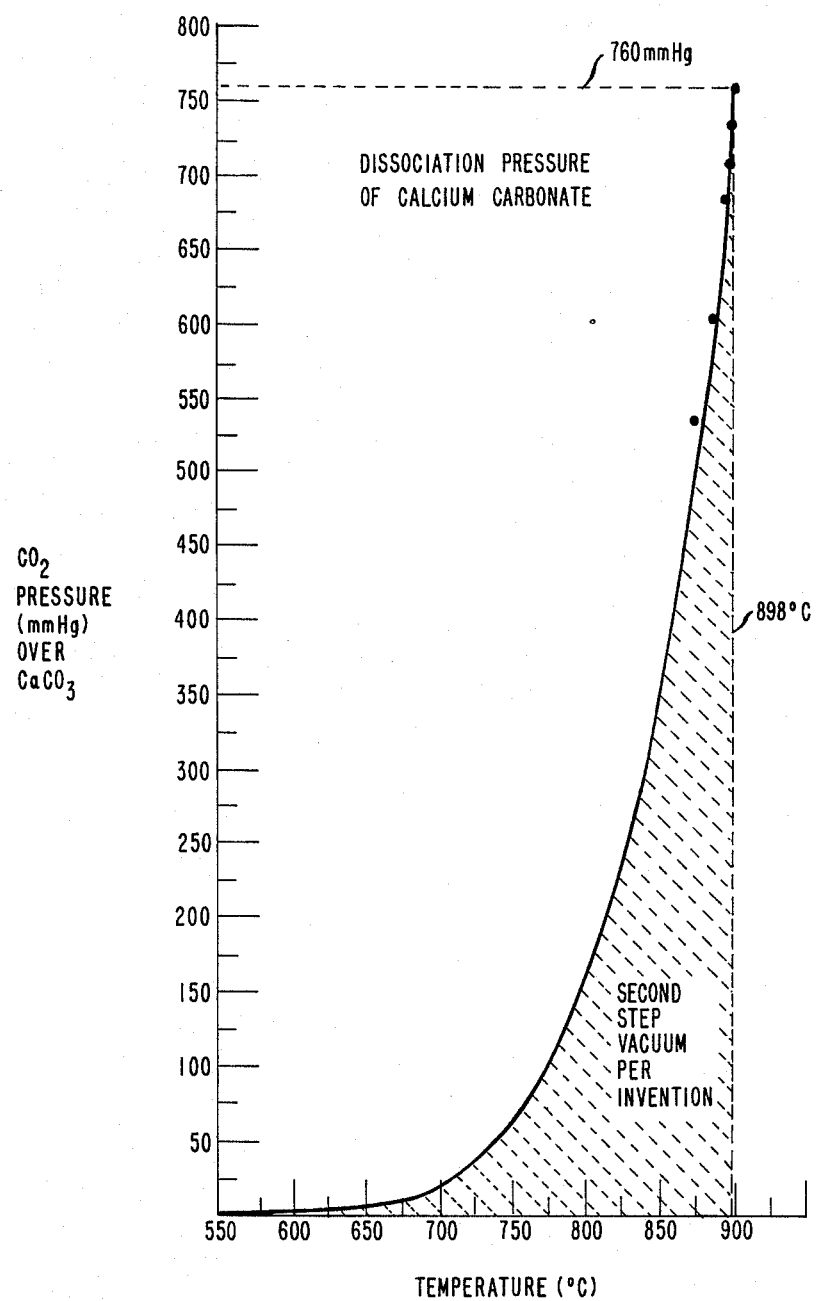
FIG. 8 is a schematic view of a graph showing a different portion of the range of, yet also having the same values as, the graph of FIG. 1, and per the shaded area thereof specifically showing the corresponding negative equilibrium pressures at corresponding temperatures, below which the second step or stage vacuum operation may be conducted at such temperatures or at higher temperatures according to the present invention.

This may similarly be more clearly appreciated from the graph of FIG. 8, which represents that counterpart portion of the graph of FIG. 1 in the pressure range between 0 and 800 mm Hg and the temperature range between 550° C. (1022° F.), and 898° C. (1648° F.), and which is also based on the data in Table 1. Whereas the graph of FIG. 1 is at the ratio of 1000 mm Hg per 50° C., and that of FIG. 7 is at the ratio of 500 mm Hg per 50° C., that of FIG. 8 is at the ratio of 25 mm Hg per 25° C., or 50 mm Hg per 50° C., for clarity of presentation.

In an analogous manner to the graph of FIG. 7, by way of extrapolation from the graph of FIG. 8, it is seen that, as compared to the equilibrium pressure of carbon dioxide at 898° C. (1648° F.) which is 760 mm Hg or ordinary atmospheric pressure, per the data of Table 1, the equilibrium pressure of carbon dioxide at 850° C. (1562° F.) is roughly about 370 mm Hg, at 800° C. (1472° F.) is roughly about 200 mm Hg (actually 183 mm Hg per the data of Table 1), at 750° C. (1382° F.) is roughly about 75 mm Hg (compared to 72 mm Hg at 749° C. (1382° F.) per the data of Table 1), at 700° C. (1292° F.) is roughly about 25 mm Hg (compared to 23 mm Hg at 701° C. (1294° F.) per the data of Table 1), and at 650° C. (1202° F.) is roughly about 10 mm Hg (compared to 13.5 mm Hg at 671° C. (1240° F.) per the data of Table 1), whereas per the data of Table 1 itself the equilibrium pressure of carbon dioxide at 605° C. (1121° F.) is 2.3 mm Hg, and at 550° C. (1022° F.) is 0.41 mm Hg.

Therefore, if the hot mass from the first step is fed to the second step at a temperature as low as 1648°-1652° F. (898°-900° C.), and/or the percentage of partial calcination in the first step is particularly low, successful completion of the remainder of the calcination can be achieved in the second step by merely using a stronger vacuum and/or an increased residence time in relation to the attendant sensible heat in the hot mass.

For emphasis, the graph of FIG. 8 depicts visually via the shaded area thereof the extent of the vacuum operation according to the second step or stage of the present invention, i.e., at a vacuum or negative pressure below the equilibrium pressure of 760 mm Hg, or 1 atm. abs., at 898° C. (1648° F.), as applicable for all temperatures theoretically down to 550° C. (1022° F.), in accordance with the values plotted from Table 1.

Thus, by referring to the graph of FIG. 8, any appropriate degree or level of vacuum or negative pressure may be selected by extrapolation, in terms of the temperature of the partially calcined hot mass being fed to the second step vacuum chamber assembly from the first step kiln discharge outlet, such that the strength of the vacuum is sufficiently below the equilibrium pressure at that temperature to complete the calcining of the remaining content of the calcium carbonate in the hot mass, so long as the partial calcining in the first step provides sufficient retained sensible heat in the hot mass, at the level of partial calcining achieved in the first step, to complete the calcining in the second step.

While for greater efficiency, and per the pressure relationship shown in FIG. 7, the temperature used in the first step will generally be at least about 1700° F. (927° C.) for normal industrial scale operations, it is clear from the graph of FIG. 8 and from Table 1 that depending on the strength of the vacuum used in the second step, the first step may be carried out at a calcining temperature below 1700° F. (927° C.), e.g., 1664° F. (906.5° C.) or 1648° F. (898° C.), and/or with a low percentage of partial calcining, since the second step may be carried out for the desired or required residence time at any appropriate level of vacuum, as the case may be, so long as per the relationship listed in Table 1 and shown in FIG. 8 the vacuum used is sufficient at the corresponding temperature of the hot mass in the second step to shift the equilibrium equation I to the right side and/or remove carbon dioxide as it forms, and so long as the degree of partial calcining in the first step is sufficient to provide a level of retained sensible heat in the hot mass in the second step to complete substantially the calcining of the remaining uncalcined calcium carbonate content present.

It will be appreciated that due to the fixed relationship between the dissociation pressure and the carbon dioxide concentration at the temperature involved, as earlier discussed, the carbon dioxide concentration in the atmosphere at 760 mm Hg is 100%, and at half that pressure, i.e., 380 mm Hg, is 50%. In terms of the data listed in Table 1, this relationship may be roughly calculated as follows:

TABLE 3

Carbon Dioxide Concentration As A Function Of The Dissociation Pressure

| $CO_2$ Pressure (mm Hg) | $CO_2$ Concentration In Atmosphere (%) | Related Table 1 Data |
|---|---|---|
| 760 | 100 | 760 mm, 898° C. (1641° F.) |
| 684 | 90 | 684 mm, 891° C. (1636° F.) |
| 608 | 80 | 603 mm, 881° C. (1618° F.)* |
| 532 | 70 | 537 mm, 871° C. (1600° F.)* |
| 456 | 60 | 420 mm, 857° C. (1575° F.)* |
| 380 | 50 | 381 mm, 852° C. (1566° F.)* |
| 304 | 40 | 311 mm, 840° C. (1544° F.)* |
| 228 | 30 | 235 mm, 819° C. (1506° F.)* |
| 152 | 20 | 150 mm, 795° C. (1463° F.)* |
| 76 | 10 | 72 mm, 749° C. (1380° F.)* |

*Closest Table 1 Data

Since the dissociation progresses incrementally from the outer zones inwardly, and since the partial calcining in the first step is desirably carried out at comparatively shorter residence times and lower calcining temperatures, the peripheral areas of the lump are not overburned, there being no concern to retain the lump in the kiln zone until the complete calcining thereof has been achieved or to apply high temperatures to assure that the liberated carbon dioxide within the confines of the lump interior will generate sufficient internal pressure to cause it to be expelled through the lump pores.

Thus, the double problem of avoiding overburning of the surface of the lump and simultaneously underburning of its core does not arise, and during the comparatively shorter residence time that the lump remains in the lime kiln, efficient soft burning of its outer zones may be safely carried out at such lower calcining temperatures without adversely narrowing or occluding the pores in its outer zones and without regard to the fact that its inner zones are not calcined.

On the other hand, upon continuing the vacuum calcining of the partially calcined lump in the vacuum chamber, the scavenging of the continuously liberating carbon dioxide will assist the removal of the carbon dioxide from the inner zones because the attendant $CO_2$ concentration will be correspondingly maintained at a low level in accordance with the data in Table 3. The expelling of the liberated carbon dioxide through the pores of the lump will be enhanced since they have not been narrowed or occluded by overburning at high temperature in the lime kiln or by remaining in the lime kiln for a prolonged calcining residence time.

Figure 9:
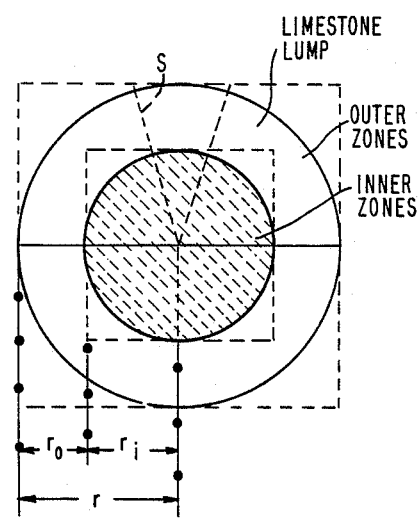
FIG. 9 is a schematic cross sectional exaggerated representation of a limestone lump showing in the unshaded area the outer zone, e.g. of about 75% of the lump volume, which is converted to the oxide in the first stage partial calcining in the lime kiln, and in the shaded area the inner zone, e.g. of about 25% of the lump volume, which is substantially completely converted to the oxide in the second stage vacuum chamber arrangement, according to the present invention.

In this regard, FIG. 9 depicts theoretically in cross section a limestone lump whose outer zones, as represented by the unshaded area, have been calcined in the lime kiln, and whose inner zones, as represented by the shaded area, are to be calcined substantially to completion in the vacuum chamber. The lump is shown in solid line as having the arbitrary shape of a sphere in cross section of radius r, with the outer zones having an annular or hollow spherical radius of $r_o$ and the inner zones having a core or solid spherical radius of $r_i$, and is alternatively correspondingly shown in phantom as having the arbitrary shape of a counterpart cube in cross section.

In the case of a lump, for example, which has been 75% calcined in the lime kiln, whether arbitrarily considered as a spherical or cubical lump, in general its radius $r_i$ at 25% volume inner zones remaining to be calcined in the vacuum chamber amounts to 63% of the total radius r, and by difference its outer zones radius $r_o$ amounts to 37% of the total radius r.

Thus, as may be seen from FIG. 9, the partial calcining of a lump to about 75% at comparatively low temperatures in the lime kiln will leave the outer zones with fairly undisturbed pores along its outer 37% radius portion corresponding to $r_o$ so that under the scavenging conditions in the vacuum chamber the carbon dioxide concentration in the 75% volume outer zones pores will remain low and its partial pressure will not have to build up internally in the lump to enable the same to be expelled, as is required under conventional practice.

At the same time, since the outer zones provide a 75% volume disperse area of progressively increasing circumference from the outer margins of the inner zones to the exterior of the lump, in the nature of outwardly diverging sectors of a circle as depicted at S in FIG. 9, the carbon dioxide which continues to be generated from the inner zones in the vacuum chamber will readily pass outwardly to the exterior of the lump, through the increasingly forming diverging sector passages of the progressively inwardly enlarging outer zones of less dense already formed lime.

Hence, although the radius $r_o$ of the outer zones will progressively increase in length, as the inner zones are converted to lime, the avenues of escape for the carbon dioxide gas will also increase in proportion to the circumference in terms of the diverging sectors, and at the same time, the amount of limestone yet to be converted will concordantly decrease. Consequently, the amount of generating carbon dioxide will decrease in finite manner as the reducing volume denser innermost core portions of the lump are reached, whereas the avenues of escape along the increasing radial distance $r_o$ will also increase in breadth in like finite manner through the less dense widening disperse areas of the diverging sectors of the increasing volume outer lime lattice.

Inasmuch as the carbon dioxide is continuously being subjected to the vacuum suction applied to the vacuum chamber, such is readily accessible locally to the interior pores of the lump via the diverging sectors within the volume of the lump and will scavenge the generating carbon dioxide therefrom, since it is not the distance of the radius $r_o$ which is believed to be important but the fact that throughout that distance the vacuum is able to reach locally the carbon dioxide and keep its concentration and partial pressure at a minimum level because of the less dense and enhanced pore filled condition of the already converted lime lattice making up the outer zones.

Indeed, to the extent that magnesium carbonate is present in the lump, the dissociation of the inner zones will be even more enhanced, because magnesium carbonate dissociates at a lower temperature than calcium carbonate and its weight loss is even greater (52.2%) than that of calcium carbonate (44%), as previously discussed. The proportionately higher evolution of carbon dioxide gas, however, is readily removed for the same reasons as noted above.

Furthermore, due to the fact that the partial calcining in the lime kiln is carried out for a shorter residence time and at lower temperatures than would be required for completely calcining the limestone therein, there is inherently less tendency for any impurities such as silica, alumina or iron oxide to slag over the surface of the lump during the partial calcining, whereupon disturbance of the porosity condition of the lump from this source is minimized, and such impurities should not raise problems as to detracting from the natural porosity of the lump throughout such diverging sectors during the vacuum calcining in the vacuum chamber.

Also, because of such improved soft burned condition of the partially calcined limestone in the lime kiln and its relatively undisturbed or even enhanced porosity condition, any sponge effect of already converted surface portions of lime or other oxide, e.g., magnesium oxide, for holding carbon dioxide superficially thereat is inherently reversed and overcome by the locally applied vacuum in the vacuum chamber.

While indirect heat exchange may be used for partially calcining the limestone in the kiln zone, understandably the use of direct heat exchange is preferred because of its greater efficiency as previously discussed, i.e., direct contact of combustion gases from any desired fuel, e.g., powdered coal, fuel oil and/or natural gas as source, with the limestone, under thorough mixing of the fuel and, preferably preheated, combustion air, at optimum flow rate for complete combustion and for maximum transfer of the heat values of the combustion gases to the limestone prior to venting of the spent combustion gases from the lime kiln.

Aside from the content of impurities such as silica, iron oxide, alumina, etc. and associated magnesium carbonate, and other factors such as the nature and quality for calcining of the native ore or limestone used, theoretically the conversion of the entire content of the calcium carbonate (mol. wt. 100) present to calcium oxide (mol. wt. 56) and carbon dioxide (mol. wt. 44) will lead to a 44% reduction in weight (LOI) leaving a 56% reduced weight quicklime product, as earlier pointed out.

As noted in the treatise Chemistry and Technology of Lime and Limestone, Robert S. Boynton, 2nd Ed. 1980, page 163, as regards conventional practice, assuming that a specific heat of limestone is calculated for $CaCO_3$ at 0.255, that the starting temperature of the limestone is 50° F. (10° C.), and that the minimum dissociation temperature is 1648° F. (898° C.), then the minimum theoretical energy requirement for the calcination would be:

0.255×2000 lbs×1648−50 (or 1598)=814,980 Btu/ton of limestone.

However, per said treatise, since 44% by weight of the limestone is volatilized as $CO_2$, theoretically 1.79 ton of limestone throughput is needed to obtain 1.0 ton of quick lime ($100CaCO_3/56CaO=1.79$), so that the minimum energy requirement for the calcination, as estimated above, must be upwardly adjusted accordingly:

814,980×1.79=1,458,814 Btu/ton of high calcium limestone.

This corresponds to 405.55 kcal/kg (since Btu/ton units are convertible to kcal/kg units by multiplying by 0.000278).

Nevertheless, as further pointed out in said treatise, there is another, larger heat requirement for producing a ton of quicklime, concerning the "retention of the dissociation temperature" until all of the $CO_2$ has been expelled. As there stated, values reported for this requirement have varied between 2.5 and 3.0 million Btu/ton (695–834 kcal/kg) for high calcium quicklime, but 2.77 and 2.60 millions of Btu/ton (770–722.8 kcal/ton) for high calcium and dolomitic quicklimes, respectively, appear to the author to be average values.

Of course, the above values as discussed in said treatise contemplate complete calcining of the limestone in a lime kiln in the conventional manner, but only theoretically at 1648° F. (898° C.).

In contrast thereto, by way of the system of the present invention, other things being equal, the actual energy requirement will be much lower than such values, at least to the extent of the corresponding degree of incompletion of the calcining in the first step, since the dissociation temperature under ambient atmospheric conditions in the first step is intentionally not retained until all of the $CO_2$ has been expelled, but instead only until the limestone has been calcined to a selective partial degree, and thus the fuel energy consumption according to the present invention, in terms of the above conventional operation calculation estimates, will not merely be below 2.5 and 3.0 million Btu/ton, but will also be below the above calculated 1,458,814 Btu/ton, of limestone throughput.

Thus, at 75% calcining in the first step, the corresponding energy requirement would only be: 1,094,111 Btu/ton (1,458,814×0.75), and at 65% calcining in the first step, such energy requirement would correspondingly be even less: 948,229 Btu/ton (1,458,814×0.65), of limestone.

In actuality, fuel consumption on an industrial scale usually amounts to about 4 to 6 million Btu/ton of limestone for shaft kilns and about 4.7 to slightly above 7 million Btu/ton of limestone for rotary kilns, in conventional operations as earlier noted, said treatise so indicating these typical values at pages 243 and 265 respectively therein.

Clearly, the energy cost for supplying a source of vacuum for the second step or stage operation for expelling the remainder of the carbon dioxide will be a mere fraction of the fuel energy cost saving in the first step or stage operation traceable to the degree or level of partial calcining, even where within practical industrial scale limits the partial conversion percentage is low, e.g., less than about 70–75%, or minimal, and/or the calcining temperature is lower than about 1700° F. (927° C.), e.g., 1648° F. (898° C.), as the case may be, such that correspondingly the degree or level of the vacuum must be higher or strong (strong negative pressure or generated suction) and/or the vacuum must be applied over a prolonged duration.

This is because the rate of fuel consumption for the kiln step per unit throughput of limestone heated in the kiln, i.e., for otherwise completing the calcining therein, e.g., from 75% to 100%, far exceeds the rate of energy consumption, e.g., of electricity, steam, fuel, etc., as energy source for operating a suction blower, suction pump, etc. for creating a source of vacuum for the vacuum step per unit removal of carbon dioxide remaining in the already partially calcined and still hot mass in the vacuum chamber, for correspondingly completing such calcining, e.g., concordantly from 75% to substantially 100%.

Indeed, just as occurs in the first step in the kiln, the hot mass in the second step in the vacuum chamber continuously declines in weight as the generated or liberated carbon dioxide is removed locally by the vacuum from the site or vicinity of the continuously further calcining hot mass, even though no further extraneous heat is supplied thereto by consuming fuel as in the first step.

Thus, although both the retained sensible heat content in the hot mass and in turn the attendant temperature continuously decline in the second step, the remaining amount by weight of unconverted calcium carbonate at any point also continuously declines relative to the remaining amount by weight of the total composite of unconverted calcium carbonate and previously converted calcium oxide in the hot mass at that point.

Consequently, a smaller amount of lower cost vacuum generating energy per unit reduced weight hot mass throughput per unit time for the reduced total residence time in the second step will be needed, as compared to the amount of higher cost fuel energy per unit starting weight limestone cold mass throughput per unit time needed for the counterpart portion of the total residence time otherwise required (per the conventional practice) to complete the calcining in the first step.

In essence, the vacuum generating energy required in the second step is a function, per unit time or per percentage of remaining uncalcined calcium carbonate, of the temperature of the hot mass and the negative pressure existing in the vacuum chamber, or stated another way is a function of (a) the ratio of the weight of the remaining calcium carbonate in the hot mass at such temperature to the weight of the total calcium carbonate and calcium oxide in the hot mass at such temperature, and (b) such negative pressure.

This is because the specific heat or sensible heat content of the already formed calcium oxide present in the hot mass also remains available at such temperature for insuring the completion of the calcining of the calcium carbonate present under the attendant vacuum, and not merely the specific heat or sensible heat content alone of the uncalcined calcium carbonate itself.

In any case, to reiterate, as contemplated herein, substantially complete calcining is meant to refer to an oxide product which possesses at most about 0.1–0.2%, or less preferably at most up to about 2%, $CO_2$ as particle or lump surface recarbonated coating, and at most about 0.25–2%, and less preferably at most up to about 5%, unconverted carbonate as core material or inner zone material.

Moreover, the limestone starting material may be any appropriate metallic carbonate rock such as high calcium limestone, e.g., calcite, and dolomite, magnesite, and the like type limestones or carbonate rocks, of any appropriate size or mixed size, and all such calcium carbonate and/or magnesium carbonate, and the like type metallic carbonate containing rock materials are contemplated by the term limestone as used herein and in the appended claims.

It will be appreciated that the foregoing specification and accompanying drawings are set forth by way of illustration and not limitation, and that various modifications and changes may be made therein without departing from the spirit and scope of the present invention, which is to be limited solely by the scope of the appended claims.

What is claimed is:

1. Limestone calcining process of first and second separate successive steps which comprises:
   in the first step, heating limestone sufficiently to achieve partial conversion thereof to calcium oxide and carbon dioxide and to form in the first step a partially calcined hot mass which itself contains sufficient retained heat for subsequently independently substantially completing the conversion of the remaining unconverted limestone therein in the second step substantially in the absence of supplying further heat thereto in the second step, and thereafter
   in the second step, independently substantially completing the conversion of the limestone in the hot mass from the first step to calcium oxide and carbon dioxide by such retained heat and substantially in the absence of supplying further heat thereto in the second step while subjecting the partially calcined hot mass from the first step to a vacuum in the second step sufficiently to remove substantially completely the resultant carbon dioxide and for a duration sufficient to achieve in the second step such substantially complete conversion of the limestone independently by such retained heat and substantially in the absence of supplying further heat thereto and thereby provide a substantially completely calcined hot mass.

2. Process of claim 1 wherein between about 50–85% partial conversion of the limestone is achieved in the first step.

3. Process of claim 2 wherein said partial conversion is between about 70–80%.

4. Process of claim 1 wherein said limestone is selected from the group consisting of calcite, dolomite, magnesite, and mixtures thereof.

5. Process of claim 1 wherein the limestone is heated to a temperature of at least about 1700° F. in the first step.

6. Process of claim 5 wherein said temperature is between about 1700°–2700° F.

7. Process of claim 5 wherein said temperature is between about 1800°–2000° F.

8. Process of claim 5 wherein said temperature is between about 1800°–1850° F.

9. Process of claim 1 wherein the first step is effected in a rotary kiln zone and the second step is effected in a separate vacuum zone, and the partially calcined hot mass is recovered from the rotary kiln zone and fed to the vacuum zone for completing the conversion of the limestone in the vacuum zone.

10. Process of claim 9 wherein the second step is alternately effected in a given one of at least two separate vacuum subzones, such that the recovered partially calcined hot mass is fed in a corresponding batch amount alternately to a corresponding subzone.

11. Energy conserving limestone calcining process of first and second separate successive steps which comprises:

in the first step, supplying sensible heat to limestone to maintain the limestone at a temperature sufficient to dissociate the calcium carbonate present to calcium oxide and carbon dioxide and thereby form a hot mass and liberated carbon dioxide, in accordance with the equilibrium dissociation reaction of calcium carbonate to calcium oxide and carbon dioxide which is dependent on the partial pressure of carbon dioxide at said temperature, and for a duration sufficient to achieve in the first step at least about 60% partial conversion of the limestone by the sensible heat in the hot mass, and thereby provide in the first step a retained sensible heat containing partially calcined hot mass in which the retained heat in the mass in the first step is sufficient for subsequently independently substantially completing the conversion of the remaining unconverted limestone in the hot mass in the second step substantially in the absence of supplying further sensible heat thereto in the second step, while removing in the first step the liberated carbon dioxide from the vicinity of the hot mass at a rate sufficient to maintain the carbon dioxide partial pressure in the first step below the corresponding equilibrium pressure at said temperature, and thereafter in the second step, continuing the dissociation reaction for independently substantially completing the calcining of the limestone, substantially in the absence of supplying further sensible heat to the partially calcined hot mass from the first step, by subjecting the sensible heat containing partially calcined hot mass from the first step to a vacuum in the second step sufficiently to remove substantially completely the further liberated carbon dioxide and for a duration sufficient to achieve in the second step substantially complete conversion of the limestone independently by the retained sensible heat contained in the partially calcined hot mass and substantially in the absence of supplying further sensible heat thereto and thereby provide a substantially completely calcined hot mass.

12. Process of claim 11 wherein between about 65–85% partial conversion of the limestone is achieved in the first step.

13. Process of claim 12 wherein said partial conversion is between about 70–80%.

14. Process of claim 11 wherein said limestone is selected from the group consisting of calcite, dolomite, magnesite, and mixtures thereof.

15. Process of claim 11 wherein the limestone is heated to a temperature of at least about 1700° F. in the first step.

16. Process of claim 15 wherein said temperature is between about 1700°–2700° F.

17. Process of claim 15 wherein said temperature is between about 1800°–2000° F.

18. Process of claim 15 wherein said temperature is between about 1800°–1850° F.

19. Process of claim 11 wherein the first step is effected in a rotary kiln zone and the second step is effected in a separate vacuum zone, and the partially calcined hot mass is recovered from the rotary kiln and fed to the vacuum zone for completing the conversion of the limestone in the vacuum zone.

20. Process of claim 19 wherein the second step is alternately effected in a given one of at least two separate vacuum subzones, such that the recovered partially calcined hot mass is fed in a corresponding batch amount alternately to a corresponding subzone.

21. Carbonate rock calcining process of first and second separate successive steps which comprises:

in the first step, heating metallic carbonate rock sufficiently to achieve sufficient partial conversion thereof to metallic oxide and carbon dioxide to form in the first step a partially calcined hot mass which itself contains sufficient retained heat for subsequently independently substantially completing the conversion of the remaining unconverted metallic carbonate therein in the second step substantially in the absence of supplying further heat thereto in the second step, and thereafter in the second step, independently substantially completing the conversion of the metallic carbonate in the hot mass from the first step to metallic oxide and carbon dioxide by such retained heat and substantially in the absence of supplying further heat thereto in the second step while subjecting the partially calcined hot mass from the first step to a vacuum in the second step sufficiently to remove substantially completely the resultant carbon dioxide and for a duration sufficient to achieve in the second step such substantially complete conversion of the metallic carbonate independently by such retained heat and substantially in the absence of supplying further heat thereto and thereby provide a substantially completely calcined hot mass.

22. Process of claim 21 wherein at least about 60% partial conversion of the metallic carbonate is achieved in the first step, and the metallic carbonate rock is heated to a temperature of at least about 1700° F. in the first step.

* * * * *